United States Patent [19]

Scheuneman et al.

[11] Patent Number: 4,600,986
[45] Date of Patent: Jul. 15, 1986

[54] PIPELINED SPLIT STACK WITH HIGH PERFORMANCE INTERLEAVED DECODE

[75] Inventors: James H. Scheuneman, St. Paul; Wayne A. Michaelson, Lake Elmo, both of Minn.

[73] Assignee: Sperry Corporation, New York, N.Y.

[21] Appl. No.: 596,215

[22] Filed: Apr. 2, 1984

[51] Int. Cl.[4] .......................... G06F 9/38; G06F 9/40; G06F 12/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,399,507 | 8/1983 | Cosgrove et al. | 364/200 |
| 4,438,492 | 3/1984 | Harmon, Jr. et al. | 364/200 |
| 4,498,136 | 2/1985 | Sproul, III | 364/200 |

Primary Examiner—Harvey E. Springborn
Assistant Examiner—A. Williams
Attorney, Agent, or Firm—Charles A. Johnson; Kenneth T. Grace; Marshall M. Truex

[57] ABSTRACT

A high performance pipelined virtual first-in first-out stack structure has a data stack portion and a split control stack portion. The stack structure is intended for use in a pipelined high performance storage unit that can pipeline up to R input requests without having received an acknowledge that a request has been honored. The data stack incorporates R+1 data stack registers to provide over-write protection to ensure that at least R data stack registers are protected from over-write. The split control stack utilizes even address and odd address stack registers. Memory bank request signals are stored sequentially and alternately between the even address and odd address stack registers. An even address read pointer and an odd address read pointer under control of a read pointer control circuit alternates the selection for read out sequentially between the even address and odd address stack registers that decoding of the memory bank request signals for the next reference can be interleaved with completion of the decoding and prioritization of the current stack register. Advancement of stack register addresses at which writing will take place is under control of a request signal. Control of the read pointers for the data stack and split control stack are responsive to bank acknowledge signals received by the read pointer control circuits.

13 Claims, 23 Drawing Figures

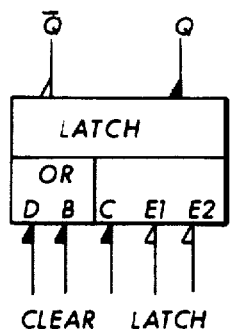
FIG. 5a
FIG. 5b
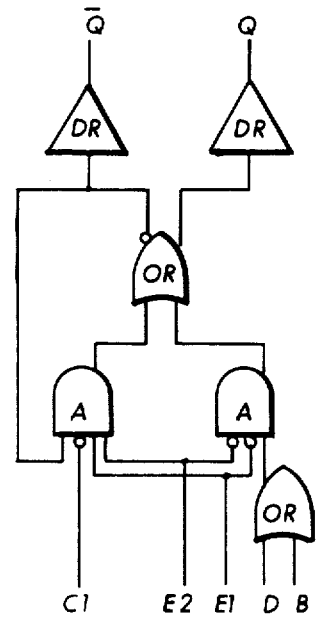
FIG. 5c
FIG. 7a
FIG. 7b
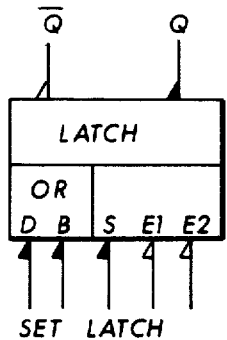
FIG. 6a
FIG. 6b
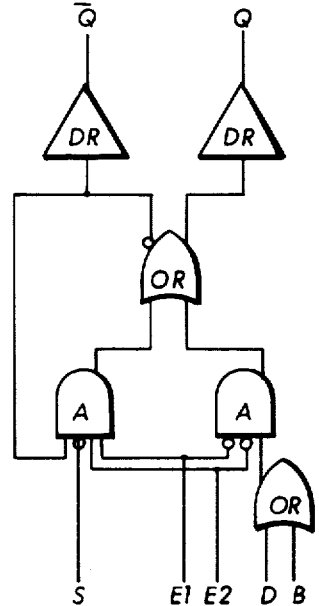
FIG. 6c

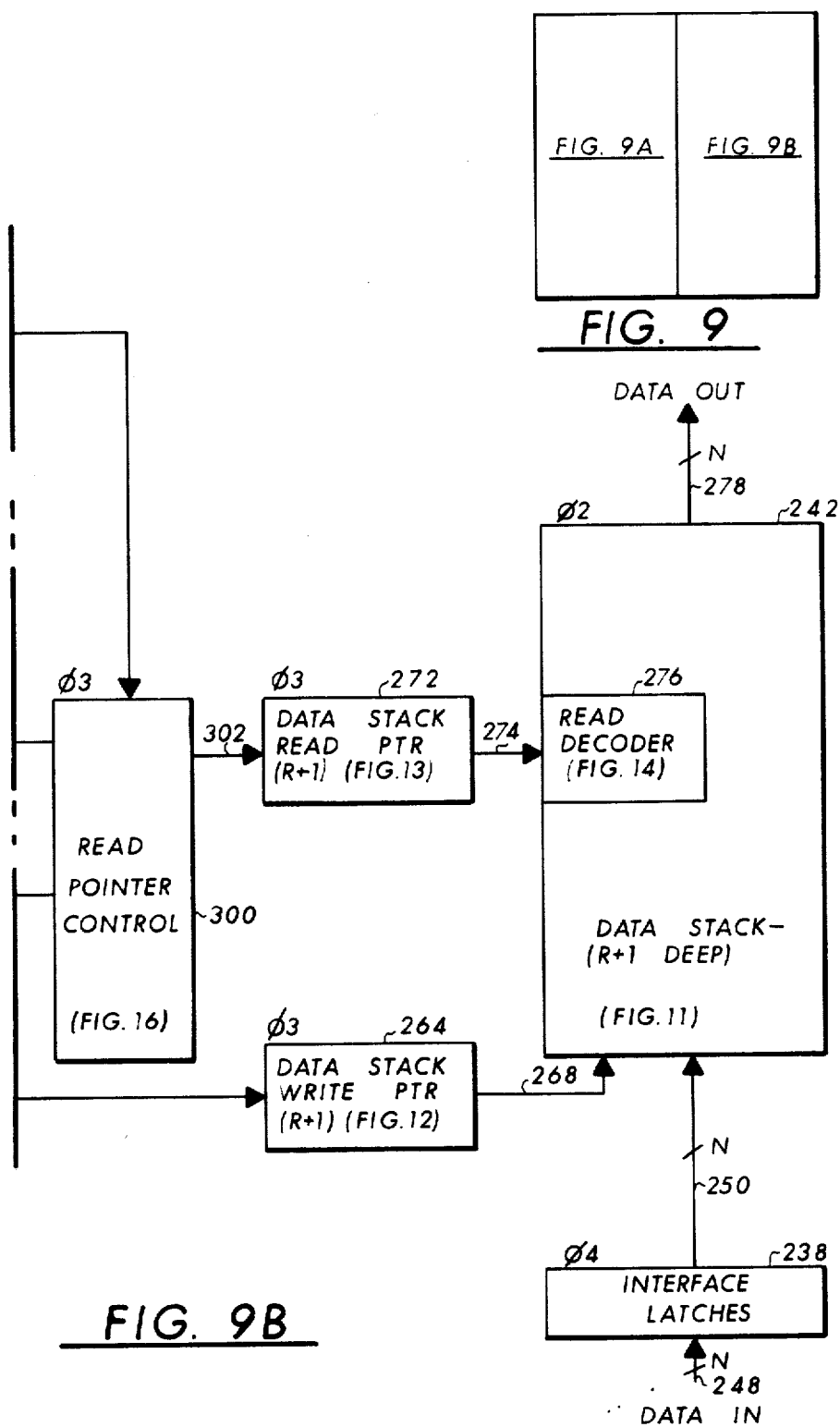

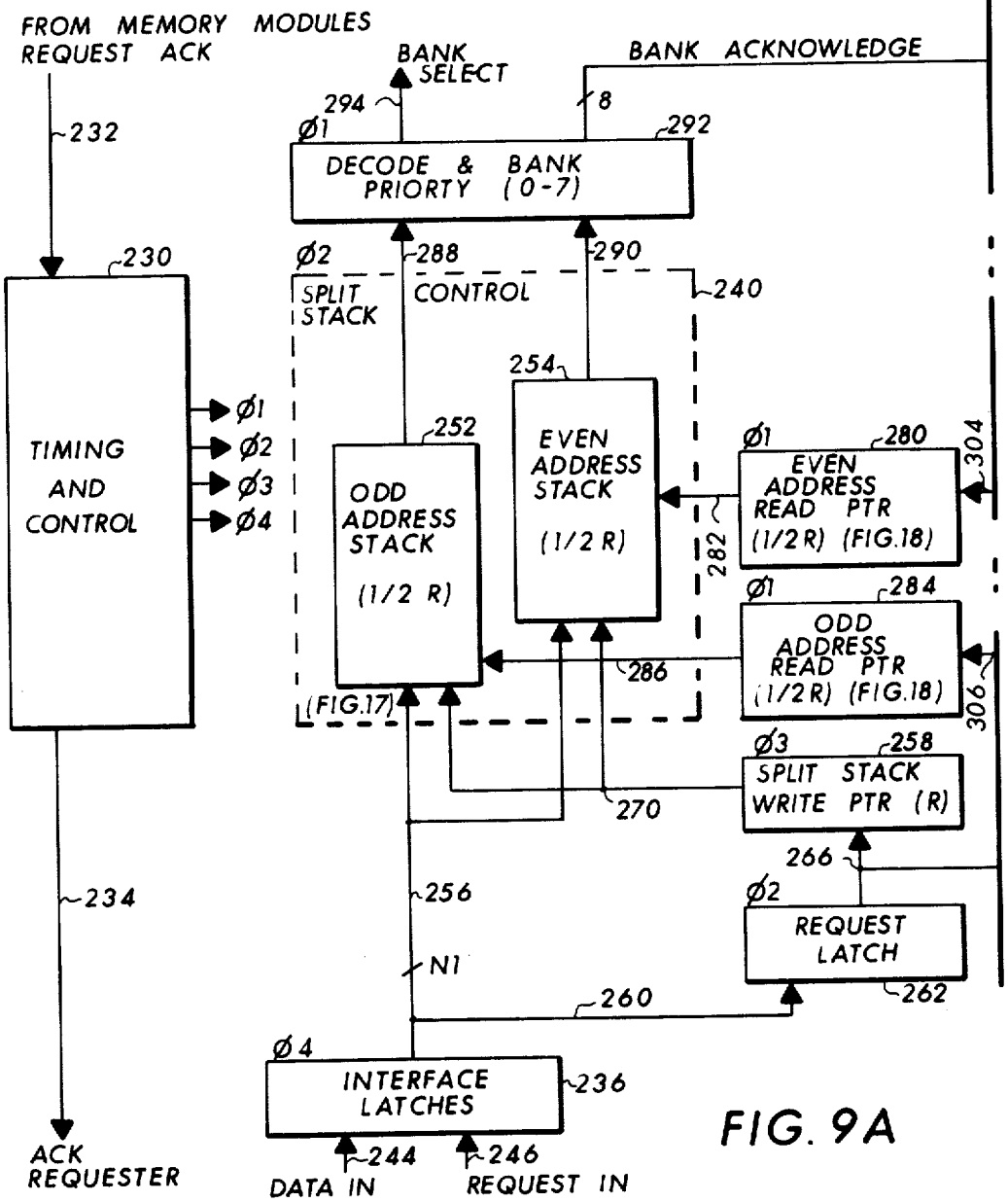

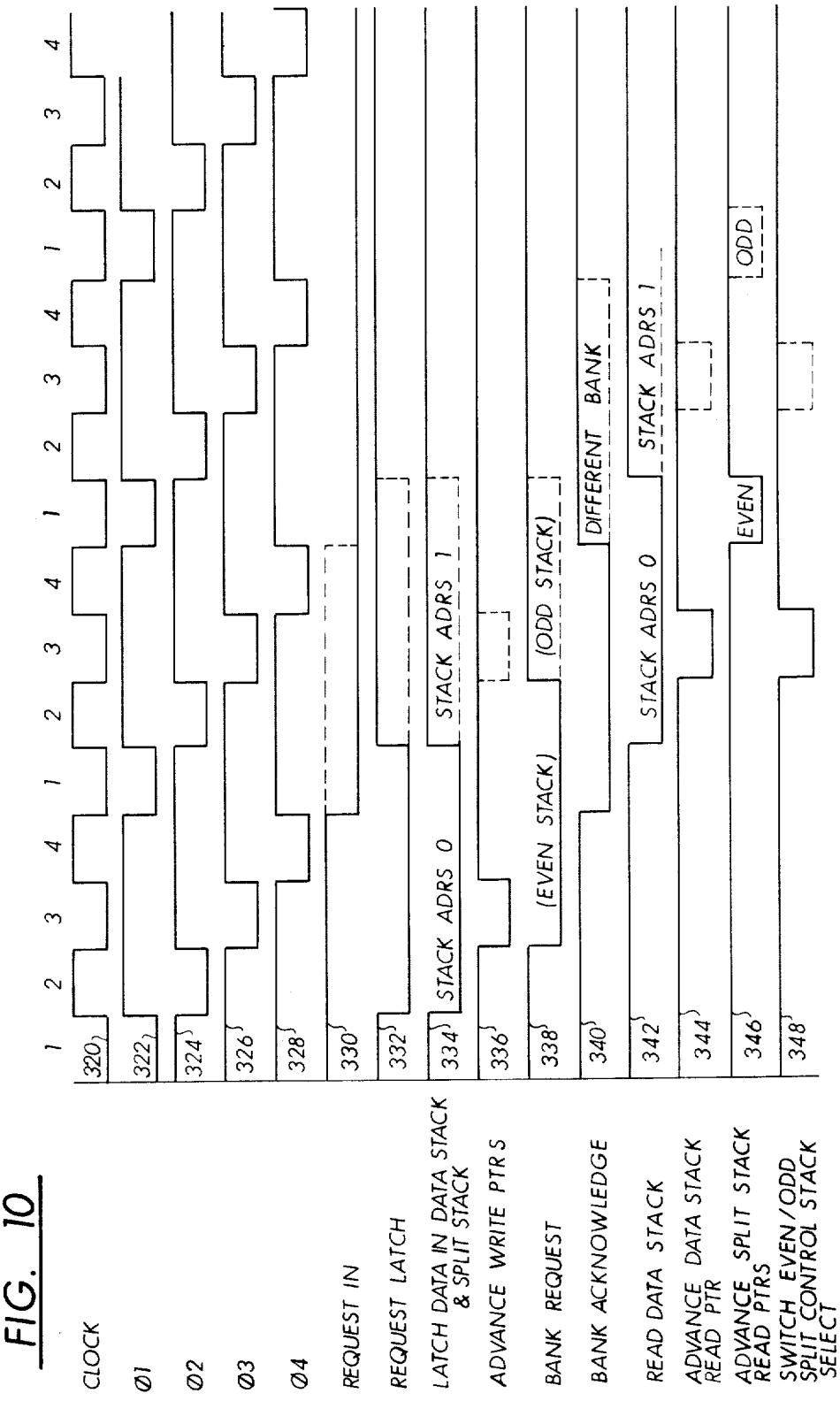

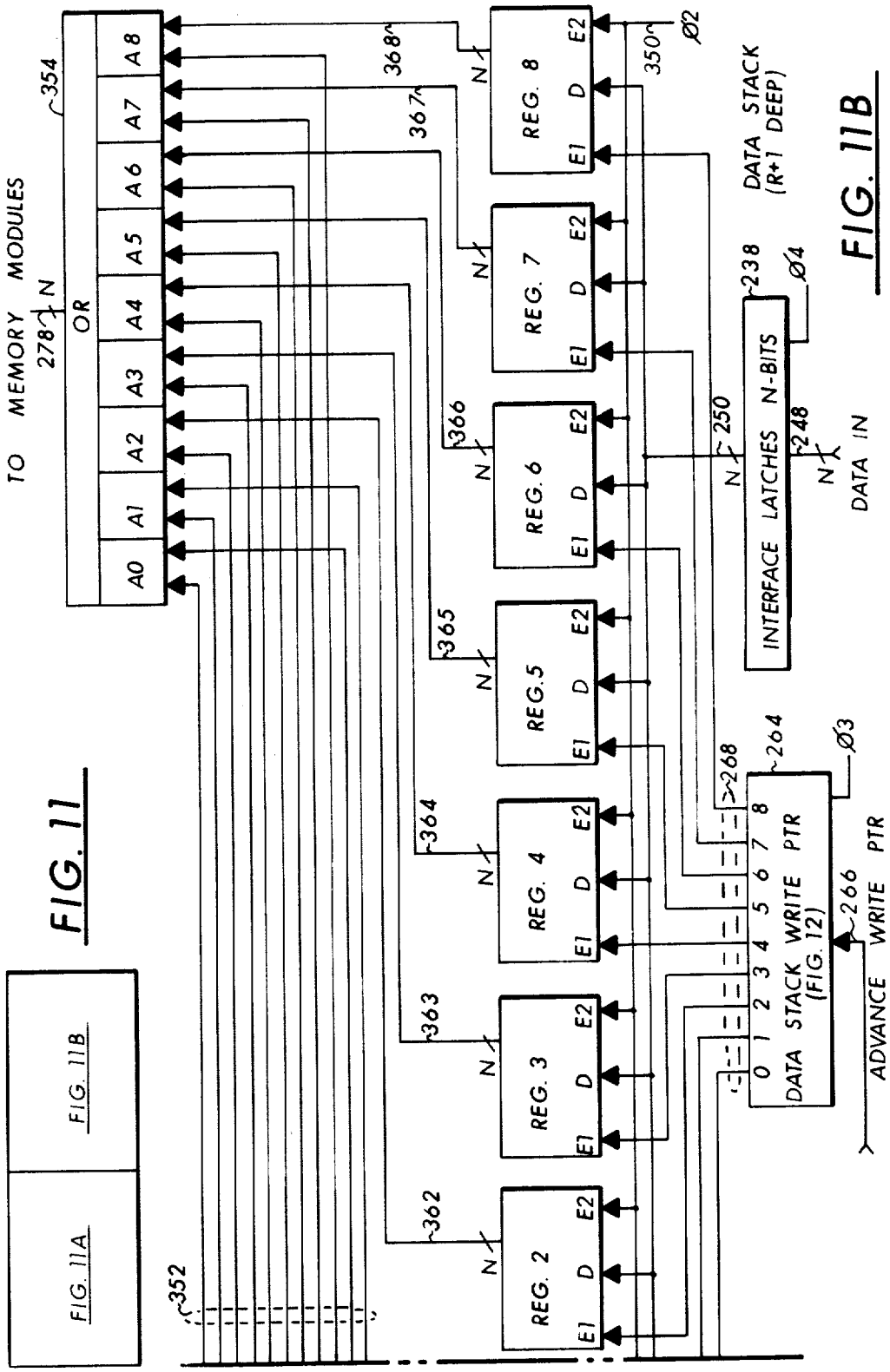

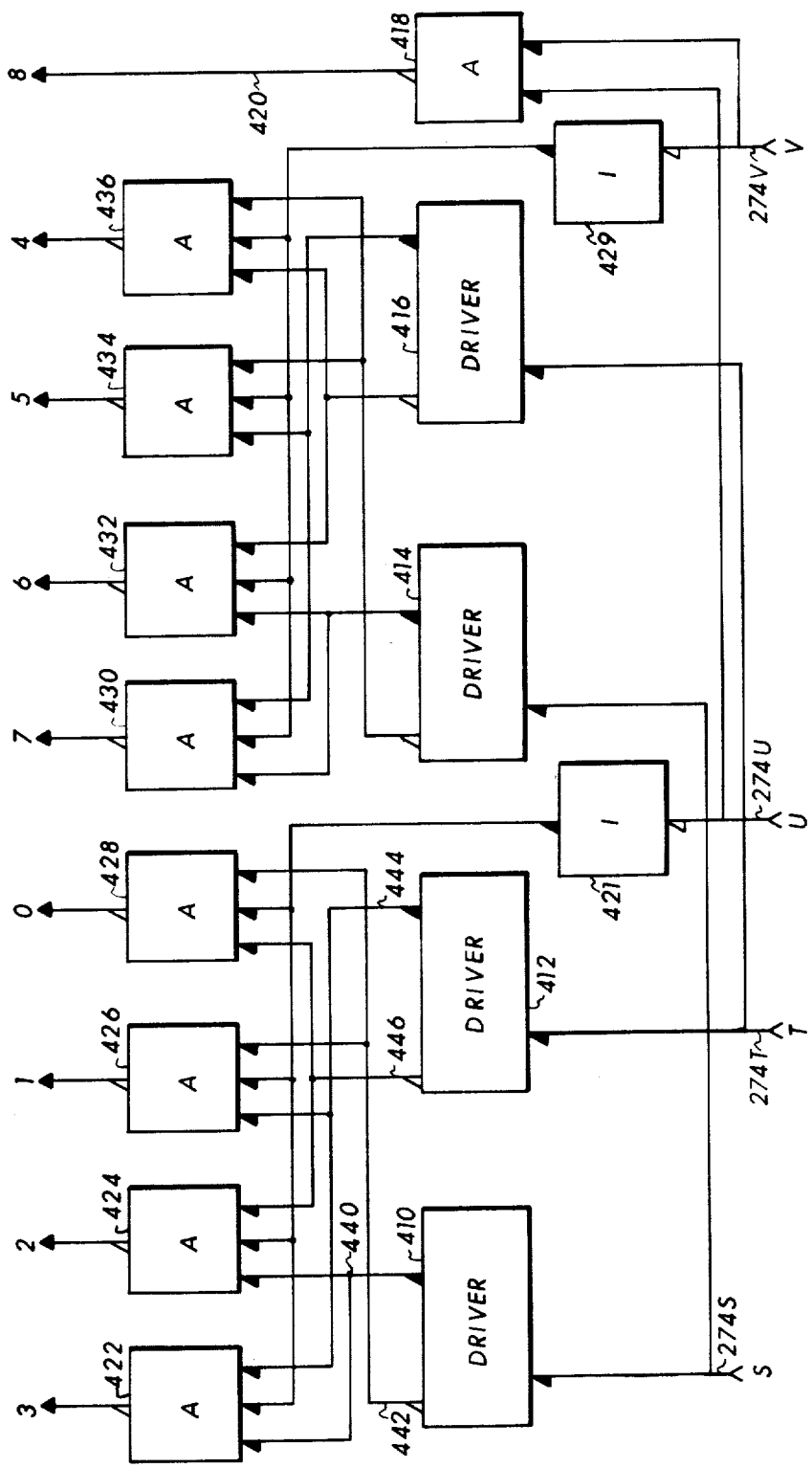

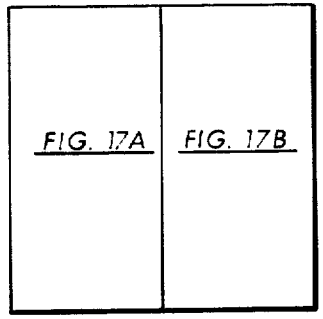
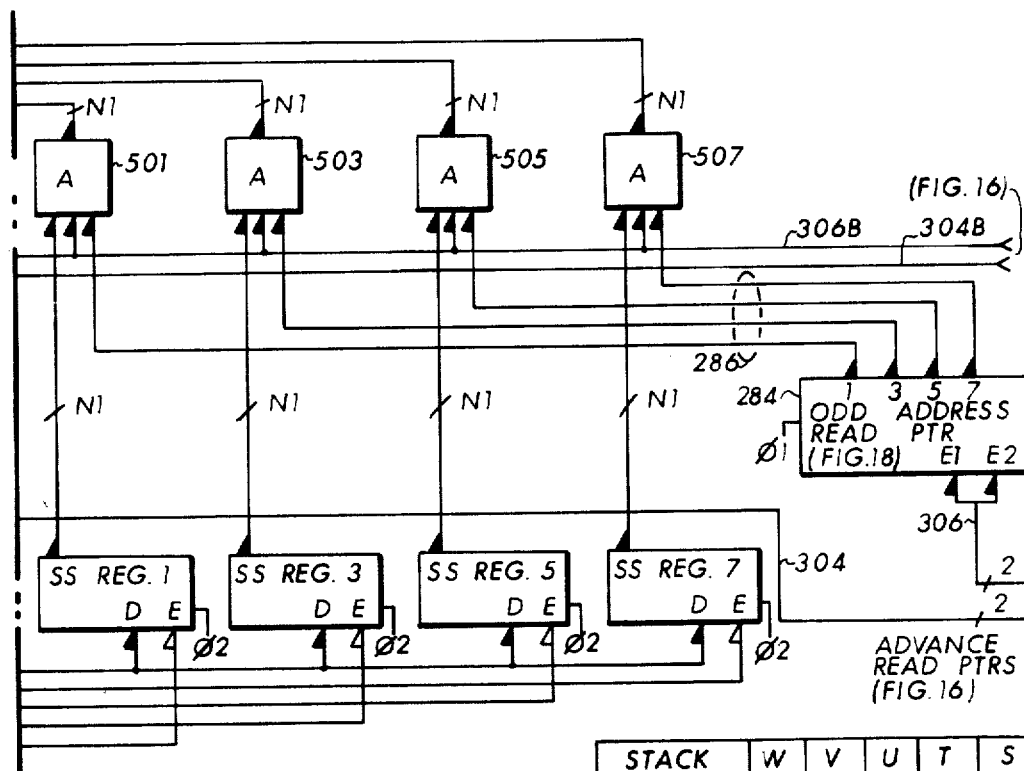
FIG. 17B
FIG. 17
DATA STACK
READ POINTER
(R+1 DEEP)
FIG. 15

SPLIT CONTROL STACK

PIPELINED SPLIT STACK WITH HIGH PERFORMANCE INTERLEAVED DECODE

RELATED PATENT APPLICATIONS

The following co-pending patent applications are assigned to the assignee to this invention, and their teachings are incorporated herein by reference:

Title: HIGH PERFORMANCE STORAGE UNIT
Inventor: James H. Scheuneman
Ser. No.: 595,864
Filed: 4-2-84

Title: MULTIPLE UNIT ADAPTER
Inventor: James H. Scheuneman
Ser. No.: 596205
Filed: 4-2-84

Title: A MULTILEVEL PRIORITY SYSTEM
Inventors: James H. Scheuneman and Wayne A. Michaelson
Ser. No.: 596206
Filed: 4-2-84

Title: PIPELINED DATA STACK WITH ACCESS THROUGH-CHECKING
Inventor: James H. Scheuneman
Ser. No.: 596131
Filed: 4-2-84

Title: MULTIPLE PORT MEMORY WITH PORT ERROR DETECTOR
Inventor: James H. Scheuneman
Ser. No.: 596132
Filed: 4-2-84

CONTENTS

Abstract of the Disclosure
Related Patent Applications
Contents
Bankground of the Invention
  A. Field of the Invention
  B. State of the Prior Art
Objects
Summary of the Invention
Brief Description of the Drawings
Description of the Preferred Embodiment
  A. Conventions
  B. The System
  C. High Performance Storage Unit
  D. Multiple Unit Adapter
  E. Scientific Processor
  F. Building Blocks
  G. High Performance Pipelined Stack System
  H. The Timing Sequences
  I. Data Stack
    I.1 Data Stack Registers
    I.2 Data Stack Write Pointer
    I.3 Data Stack Read Pointer
    I.4 Data Stack Read Pointer Decoder
  J. Read Pointer Control
  K. Split Control Stack
    K.1. Split Control Stack Register And Control
    K.2. Split Control Stack Read Pointer
  L. Summary
Claims

BACKGROUND OF THE INVENTION

A. Field of the Invention

This invention relates to the field of digital data processing systems wherein one or more host data processors utilize one or more supporting Scientific Processors in conjunction with storage systems that are commonly accessible. More particularly it relates to an improved High Performance Storage Unit for use in such a digital data processing system. Still more particularly, it relates to an improved pipelined stack that utilizes at least two groupings of Stack Registers with High Performance Interleaved Decoding of access to the groups of Stack Registers to enhance the rate of stack operation.

B. State of the Prior Art

Digital data processing systems are known wherein one or more independently operable data processors function with one or more commonly accessible main storage systems. Systems are also known that utilize a support processor with its associated dedicated supporting, or secondary storage system. Such support processors are often configured to perform specialized scientific computations and are commonly under task assignment control of one of the independently operable data processors. The controlling data processor is commonly referred to as a "host processor". The host processor characteristically functions to cause a task to be assigned to the support processor; to cause required instructions and data to be transferred to the secondary storage system; to cause the task execution to be initiated; and to respond to signals indicating the task has been completed, so that results can be transferred to the selected main storage systems. It is also the duty of the host processor to recognize and accommodate conflicts in usage and timing that might be detected to exist. Commonly, the host processor is free to perform other data processing matters while the support processor is performing its assigned tasks. It is also common for the host processor to respond to intermediate needs of the support processor, such as providing additional data if required, responding to detected fault conditions and the like.

In the past, support scientific data processors have been associated with host data processing systems. One such prior art scientific processor is disclosed in U.S. Pat. No. 4,101,960, entitled "Scientific Processor" and assigned to Burroughs Corporation, of Detroit, Mich. In that system, a single instruction multiple data processor, which is particularly suited for scientific applications, includes a high level language programmable front-end processor; a parallel task processor with an array memory; a large high speed secondary storage system having a multiplicity of high speed input/output channels commonly coupled to the front-end processor and to the array memory; and an over-all control unit. In operation of that system, an entire task is transferred from the front-end processor to the secondary storage system whereupon the task is thereafter executed on the parallel task processor under the supervision of the control unit, thereby freeing the front-end processor to perform general purpose input/output operations and other tasks. Upon parallel task completion, the complete results are transferred back to the front-end processor from the secondary storage system.

It is believed readily seen that the front-end processor used in this earlier system is a large general purpose data processing system which has its own primary storage system. It is from this primary storage system that the entire task is transferred to the secondary storage system. Further, it is believed to be apparent that an input-/output path exists to and from the secondary storage system from this front-end processor. Since task transfers involve the use of the input/output path of the front-end processor, it is this input/output path and the transfer of data thereon between the primary and secondary storage systems which becomes the limiting link between the systems. Such a limitation is not unique to the Scientific Processor as disclosed in U.S. Pat. No. 4,101,960. Rather, this input/output path and the transfers of data are generally considered to be the bottleneck in many such earlier known systems.

The present scientific data processing system is considered to overcome the data transfer bottleneck by providing a unique system architecture using a high speed memory unit which is commonly accessible by the host processor and the scientific processor. Further, when multiple high speed storage units are required, a multiple unit adapter is coupled between a plurality of high speed memory units and the scientific processor.

Data processing systems are becoming more and more complex. With the advent of integrated circuit fabrication technology, the cost per gate of logic elements is greatly reduced and the number of gates utilized is ever-increasing. A primary goal in architectural design is to improve the through-put of problem solutions. Such architectures often utilize a plurality of processing units in cooperation with one or more multiple port memory systems, whereby portions of the same problem solution may be parcelled out to different processors or different problems may be in the process of solution simultaneously.

When a Scientific Processor (SP) is utilized in a data processing system to perform supporting scientific calculations in support of a host processor or processors, and is utilized in conjunction with two or more High Performance Storage Units (HPSU's), the problem of timing of access of the SP to any selected HPSU for either reading or writing causes problems of access coordination. In order to coordinate and provide the required control, the over-all system is arbitrarily bounded to require that the SP issue no more than a predetermined number of Requests for access without the receipt back of an Acknowledge. In one configuration, the system is bounded by requiring that no more than eight such Requests be issued by the SP without receipt of an Acknowledge. The details of the interface and control of a Multiple Unit Adapter for transmitting data to and from a designated HPSU by the SP is described in detail in the co-pending application entitled "Multiple Unit Adapter". There it is pointed out that the interface to the HPSU's must also provide for and accommodate different requesters that may be associated therewith. While the data processing system is essentially synchronous, that is operations are under clock control in their execution, the occurrence of Requests, the availability of responding units, and the occurrence of Acknowledge signals are asynchronous with respect to each other. The details of operation of the HPSU's are set forth in detail in the co-pending application entitled "High Performance Storage Unit".

The prior art has recognized the advantageous operation of utilizing buffers to match transmissions between two operating systems that have different operational rates. As so-called pipelined architectures were developed to improve the rates of through put, the concept of buffering was extended to the development of intermediate stack structures for temporarily storing or holding data items pending availability of the destination unit. Early versions of stacks of this type involved a first-in first-out (FIFO) structural arrangement with control that would cause Requests and data to be shifted through the stack shift registers such that the first Request and its associated data would be processed first and then on in order as they occurred. This type of shift register stack requires the control to cause shifting through the registers as Acknowledges are received, together with control to determine when the stack is full and no more Requests can be received. Shifting stacks are relatively slow, consume unnecessary power, and require an undue amount of circuitry to implement.

The problems with shift register stacks have been addressed and various configurations of virtual FIFO stacks have been developed. In virtual FIFO stacks data words are stored in registers controlled by loading identifiers. The data words once stored remain in the associated stack register until accessed for readout, and do not shift from register to register. Instead, the shifting of readout is directed and controlled by readout control signals. In operation, then, when data is to be loaded or written in the stack, the Load Pointer (Load PTR) or Write Pointer (Write PTR) is advanced for each write operation. Similarly, for each read operation the Read Pointer (Read PTR) is advanced. When appropriately controlled, the Pointers sequence circularly through the stack registers at all times providing a FIFO function. By thus controlling the Pointers, it is unnecessary to shift the data from stack register to stack register. When no data is stored in the stack, the two Pointer would reference the same stack register address. The difference between the Load PTR and Read PTR indicates the number of words in the buffer stack. When the Pointers are binary numbers the difference is a numerical count.

It is of course apparent that since the virtual FIFO stack is functionally circular, external control must be exercised in applying Requests to read and write to avoid over-writing. Accordingly, such virtual stacks are also normally bounded to accommodate a predetermined number of load Requests that can occur without having received an Acknowledge that results from reading out a register from the stack.

Virtual FIFO stacks are described in the identified co-pending applications, and have been described in technical literature.

Various other types of virtual stack structures have been described, for example where a virtual FIFO buffer can accommodate variable numbers of data words, and where synchronization is dynamically adjusted depending upon the rate of transfer through the FIFO buffer. An example of the latter type of FIFO buffer is described in U.S. Pat. No. 4,288,860, entitled "Dynamic Storage Synchronizer Using Variable Oscillator" issued to John R. Trost and assigned to the assignee of the subject invention.

In order for a High Performance Storage Unit (HPSU) to operate at a first interface data rate with host processors, and to operate at a second substantially faster interface data rate with associated Scientific Processors, it was found that pipelined stack structures of the type known in the prior art were inadequate. In a preferred embodiment where the host processor interface rate is two parallel memory words at 60 nanoseconds, and the SP interface is four parallel memory words at 30 nanoseconds, it became clear that the serial time to manipulate the Read PTR, to accomplish the readout of the address information and to decode and issue a Bank Request to the selected one of the plurality of Memory Banks in the system was too long. The specific bit configuration for accessing and addressing the various Memory Banks in the HPSU are described in the identified related patent applications, and in particular in the application entitled "High Performance Storage Unit."

OBJECTS

It is a primary object of the invention to provide an improved digital data processing system wherein one or more host data processors utilize one or more supporting scientific processors in conjunction with storage systems that are commonly accessible.

Another primary object of the invention is to provide an improved High Performance Storage Unit for use in a data processing system.

It is a further primary object of the invention to provide an improved pipelined stack structure.

Yet another primary object of the invention is to provide a pipelined split stack structure with high performance interleaved decoding of stack register read out addresses.

Still another object of the invention is to provide an improved virtual first-in first-out (FIFO) stack structure having a split and interleaved portion for enhancing the rate of generation of memory bank request signals.

Still a further object of the invention is to provide a virtual FIFO stack structure having a pipelined split and interleaved set of stack registers providing interleaved memory bank request signals in conjunction with a second portion for writing and reading data words.

Another object of the invention is to provide a virtual FIFO stack structure having a split stack portion for receiving and storing memory bank request signals associated with data words, and having first and second reading control circuits for alternating the selection and issuance of memory bank request signals between the split stacks.

Still another object of the invention is to provide improved control circuitry for interleaving the issuance of memory bank request signals from two sets of pipelined virtual FIFO split stack structures.

The foregoing objectives and other more detailed and specific objects will become apparent and be understood from the drawings and the description of the invention.

SUMMARY OF THE INVENTION

The digital data processing system includes one or more host processors each coupled to one or more high performance storage units. Host processors can be selected from units available commercially, where the 1100/90 System available from Sperry Corporation is found to be particularly advantageous.

The High Performance Storage Unit (HPSU) is unique, and is basically a memory unit capable of coupling to various pluralities of instruction processors, and input/output units as well as to a pair of Scientific Processor (SP). Since each HPSU is directly connected to the input/output units and the instruction processors of the host system, it is an inherent part of the host data processing system. On the other hand, since it is also directly connected to the Scientific Processor, it is also its main storage system. Because of its novel properties, it is able to interface both with the host system and the Scientific Processor without the resulting "bottleneck" of past scientific data processing systems.

When more than one HPSU is desired to provide additional storage capacity, a Multiple Unit Adapter (MUA) is utilized between each Scientific Processor and multiple High Performance Storage Units. Generally, the MUA is an interface unit which couples a single Scientific Processor through the use of a single Scientific Processor port to a plurality of up to four HPSUs via four HPSU ports. In this manner a Scientific Processors may address, read and write any location in any of the HPSUs.

The MUA is used in a scientific data processing system to interface at least one Scientific Processor to a plurality of High Performance Storage Units. The use of a separate MUA in such a data processing system enables the Scientific Processor of such a system to have a single HPSU port to thereby reduce the cost of the Scientific Processor when a single HPSU is desired to be used in the system. This MUA is required only when more than one HPSU is used in the scientific data processing system, thereby providing the additional memory interfaces needed for the Scientific Processor.

The Scientific Processor (SP) used herein is a special purpose processor attached to the host system via the HPSU(s). It is optimized for high speed execution of floating-point vector arithmetic operations. The SP provides increased performance for both integer and floating-point scalar operations that are embedded in the vectorized code to thereby provide overall increased performance for scientific vector FORTRAN programs.

The invention includes a High Performance first-in first-out stack structure for providing a pipelined temporary storage of words to be stored in the High Performance Storage Unit pending availability of access of the stack to the Memory Banks. The stack structure includes the plurality of registers for storing data words to be recorded or written, with each Stack Register being accessed for writing into the Stack Register by a Write Pointer (Write PTR). The data words are pipelined in sequence, and the write PTR is advanced for each requested loading function into the stack structure. By thus advancing the Write PTR, requests can be loaded up to the capacity of the stack structure without having to read any of the Stack Registers.

In the virtual pipelined stack configuration, reading from the stack is under control of a Read Pointer (Read PTR). The Read PTR is decoded and provides an unique identification of the Stack Register selected to be read out.

In this context "data word" means actual data signals together with appropriate associated signals such as required to provide address and function control. The pipelined virtual FIFO stack structure includes a data stack portion having associated Write PTR and Read PTR circuitry for pipelineding data words. The stack structure also includes a Split Control Stack portion for providing pipelined Memory Bank Request signals, together with selected address signals. The Split Control Stack portion is effectively split such that a first group of Split Control Stack Registers, designated the Even Stack, is under control of an Even Address Read PTR, while a second group of Split Control Stack Registers, designated the Odd Stack, is under control of an Odd Address Read PTR.

Pointer Control circuitry is utilized to control the Read PTR and the Write PTR for the Data Stack, and to control the Write PTR, the Even Address Read PTR and the Odd Address Read PTR for the Split Control Stack in response to received Request In signals and Bank Acknowledge signals. The Pointer Control circuitry functions to interleave operation of the Split Control Stack in a manner such that the appropriate Even Address Read PTR or Odd Address Read PTR is advanced, the designated Split Control Stack Register read out, the Memory Bank Request decoded and made available in parallel with the time necessary to receive the Bank Acknowledge for the preceding Memory Bank reference. The Pointer Control thereby causes the Odd Stack and the Even Stack references to be alternated, or interleaved, and reduces the serial time necessary for issuance of each Memory Bank Request.

The interleaving of generation of Memory Bank Requests provides an enhanced control function that permits increased rates of interchange of data words with the Memory Banks, while maintaining pipelined in and pipelined out functional characteristics for the entire stack structure.

BRIEF DESCRIPTION OF THE DRAWINGS

FIG. 5a is the logic block diagram for a Clear Latch;

FIG. 5b is a Truth Table for the Clear Latch illustrated in FIG. 5a;

FIG. 5c is a logic element drawing for the Clear Latch illustrated in FIG. 5a;

FIG. 6a is a logic block diagram for a Set Latch;

FIG. 6b is a Truth Table for the functioning of the Set Latch illustrated in FIG. 6a;

FIG. 6c is a logic element drawing of the Set Latch illustrated in FIG. 6a, and illustrates the logical elements and interconnections to accomplish the Latch functions;

FIG. 7a is a logic block diagram symbol for the two-input Exclusive-OR (XOR);

FIG. 7b is the Truth Table for the Exclusive-OR illustrated in FIG. 7b;

FIG. 9 is a simplified block diagram of a High Performance pipelined virtual first-in first-out (FIFO) stack structure having a Data Stack with associated Read Pointer and Write Pointer, a Split Control Stack having an associated Split Control Stack Write Pointer together with a pair of Read Pointers, each for controlling associated groups of Split Control Stack Registers, and Pointer Control circuitry;

FIG. 10 is a sequence timing diagram illustrating sequences of operation in the improved high performance virtual FIFO stack;

FIG. 14 is a logic block diagram of the Read Pointer Decoder utilized in the Data Stack illustrated in FIG. 11;

FIG. 15 is a function table illustrating Data Stack Register selection for the Read Pointer utilized in the Data Stack illustrated in FIG. 11;

DETAILED DESCRIPTION OF THE PREFERRED EMBODIMENT

A. Conventions

Figure 1:
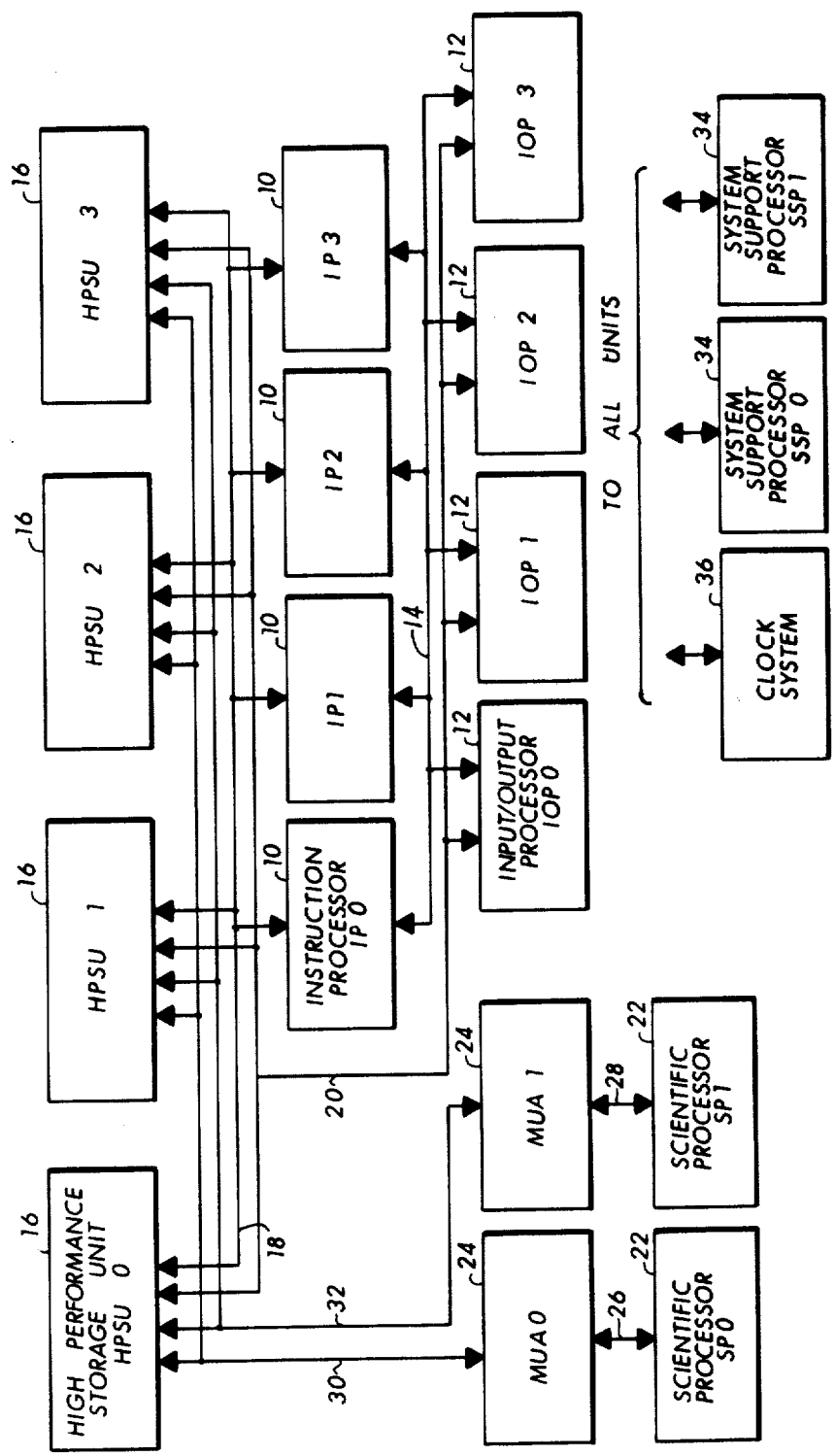
FIG. 1 is a system block diagram of the over-all digital data processing system in which the invention can be utilized.

Throughout the following description and in the accompanying drawings there are certain conventions employed which are familiar to those that are skilled in the art to which this invention pertains. Within the application, reference numerals will be affixed to elements and items discussed. To the extent possible, elements that are referenced in different figures within the application will bear the same reference numeral. It will be understood that elements may be described or mentioned in others of the identified co-pending applications, but will not necessarily bear the same numeral reference between applications.

The signal lines, control lines, and cables are accorded unique descriptive names which will remain invariant to the extent possible at all points of usage and reference within the application. Signal lines generally enter at the bottom of a Figure and exit at the top, resulting in a general flow from bottom to top. Signals and signal lines which enter or exit the logic circuit of a Figure all together from outside the circuit are accorded descriptive symbolism in order that they may be clearly recognized.

Block diagrams will be utilized to describe the interrelationship of identified functional units. Interconnecting lines between functional units can represent a single wire conductor, a group of parallel conductors, or a general path of data for control flow. In block diagrams the arrowhead will indicate the direction of signal flow for the particular data or control signals identified. Where appropriate, emphasis for particular lines may be added to indicate specific paths, for example through the use of heavy lines; through addition of numerals indicative of the number of conductors or parallel signal paths involved, or by indication of unique function. Within block diagrams specific logical symbols for well known components such as adders, selecters, registers, multiplexers, and the like may be utilized without further explanation of the specific elements, since such elements are so well known in the art as they require no additional explanation.

For purposes of discussion of specific logic block diagrams or functional logic circuits, it is convenient to have a reference of signal levels. For many it is desirable to relate logical "1" and logical "0" to signal levels. In general, a logical "1" will be the equivalent of a High signal, and a logical "0" will be the equivalent of a Low signal, but it should be clearly understood that as given input signals pass through networks of logic circuits that the relationship of logical "1" and logical "0" as they relate to numerical values will not directly relate. Accordingly, the clearest understanding of logic block diagrams and functional logic circuits will be most clearly understood from a consideration of the High and Low signal interrelationships. It is of course understood that these representations of signal levels are illustrative and relate to a rendition of the preferred embodiment, but that alternative signal level representations can be used without departing from the scope of the invention.

In more detailed logic block diagrams, block symbols will be utilized to represent various functions. For the lower order logical functions such as AND, designated A; OR; Inversion designated I, and the like, the designations within the block symbols of the respective functions is readily understandable to those skilled in the art. More complex macro logical functions, for example multiple input Exclusive-OR, designated XOR, may not be readily apparent from the block symbol, and in such cases the macro function will be further defined through functional logic diagrams or truth tables or a combination thereof.

As a further aid in understanding the logic block diagram representations, a system of arrowhead representation at the input and output of the block symbols will assist in defining the function of the associated logic element. In this regard, the combination of signals represented at the input of a logic element in combination with the designation of the logical function will define the signal level or levels at the output of the logic element. At the input, a closed half-arrowhead represents a response to a High signal and an open half-arrowhead indicates that the response is to a Low signal. Accordingly, if an AND circuit (A) is represented having two or more closed half-arrowheads at the input, it will indicate that the AND function is on High signals and will be satisfied only when all input lines receive High signals. In a similar manner, if an A symbol is illustrated having two or more open-arrowhead inputs, the function designated is that of Low AND, and will be satisfied only when all inputs are Low. It is apparent that this Low AND function is logically equivalent of an High OR function. In a similar fashion, the half-arrowhead convention is applied to define output relationships.

In physical construction of circuits to implement the designated logic functions, it is not uncommon to provide signal inversion in conjunction with the combinatorial logic function. In such cases the fact of inversion will be designated by the state of the half-arrowhead on the output line or lines. In this way, it will be understood that a Low AND circuit having two or more open half-arrowhead inputs will provide a Low output signal at the open half-arrowhead output terminal only when all input signals are Low. If the Low AND circuit has a closed half-arrowhead at its output, it is understood that inversion takes place within the logic block element, and the High output signal will be derived only when all input signals are low. It is also common for circuits implemented through integration techniques to provide an output signal and the complement of the output signal on separate lines. This representation in the logic block diagram symbol will result in an open half-arrowhead and a closed half-arrowhead at the output of the block. Generally speaking the right-most half-arrowhead in the symbolic representation will be considered as the true output and will define the function of the element, and the left-most half-arrowhead will be considered as the complement thereof. For example, an A symbol having two or more closed half-arrowhead inputs and a right-most closed half-arrowhead would normally indicate an AND function of High signals resulting in a High output signal at the closed half-arrowhead only when all input signals are High. If this same symbol utilizes an open half-arrowhead at the left, a Low output signal will be derived at that point when all input signals are High. it is not deemed necessary to illustrate specific circuits to accomplish the basic logic functions since various types of electronic circuits can be utilized and are well known to those skilled in the art.

In the event detailed logical circuit diagrams of macro symbols are illustrated, the symbol having a straight bottom and rounded top, sometimes referred to as the "bullet" symbol, represents the logical AND function; and the symbol having a curve at the input and the curve pointed output, often referred to as the "shield" symbol, represents circuits that perform the logical OR function. For the AND function the straight line input or the dot, represents a High AND, and results in a High output signal when all input signals are High. The open circles adjacent the input terminals indicate that the circuit responds to Low signals. The straight line output is equivalent to the closed half-arrowhead representation described above, and the circle output designation is equivalent to the open half-arrowhead representation. This type of symbol is well known in the art and need not be described further.

B. The System

FIG. 1 is a system block diagram of the over-all digital data processing system in which the invention can be utilized. The over-all system is essentially moduler, and provides for parallel processing.

For the configuration illustrated, from one to four Instruction Processors IP0 through IP3, each labelled 10, can be utilized. Each IP can for example be a Type 3054-00 unit available from Sperry Corporation, or such other Instruction Processor available commercially as would be compatible. The IP provides basic mode and extended mode instruction execution, virtual machine capability, and contains two buffer memories (not shown), one an operand buffer, and the other an instruction buffer. Each IP is functional to call instructions from memory, execute the instructions, and in general does data manipulation. The IP also executes instructions to set up input and output data buffers and channel access control.

In conjunction with the IPs, from one to four Input-/Output Processors IOP0 through IOP3, labelled 12, can be utilized. The interconnections between the IPs and the IOPs, collectively labelled 14, are in fact direct connecntions between each unit, and the interconnection is not bused. Each IOP can be a Type 3067-00 unit available from Sperry Corporation, or an equivalent type of processor. The IOPs handle all communications between the IPs, and the memory systems, and the peripheral subsystems (not shown). In this type of configuration, the IPs function as the system Central Processing Units, and the IOPs act as CPUs to handle all of the communications. The IPs and IOPs are commonly referred to as the 1100/90 system.

From one to four High Performance Storage Units HPSU0 through HPSU3, each labelled 16, can be utilized in the system. Each HPSU is a free-standing unit with eight memory Banks, each Bank containing 524K words. Each HPSU provides four Instruction Processor (IP) ports for providing communication paths to the IPs, both for reading and writing, shown collectively as interconnection paths 18. Again it should be understood that interconnection between each HPSU and each IP is directly cabled, and is not bused. Each HPSU also includes four Input/Output Processor (IOP) ports for interconnection with the IOPs. These interconnections are shown collectively as interconnections 20 and are direct cables between each HPSU and each IOP. The IP and the IOP ports are each two-word read and write interfaces, where each word contains 36 data bits and four parity bits. Each HPSU also includes at least one Scientific Processor (SP) port, and in the embodiment shown has two such SP ports. Each SP port has a four-word data interface. The IOP and the IP interfaces operate on a 60 nanosecond clock cycle and the SP interface operates on a 30 nanosecond clock cycle. The HPSU is a novel memory system and is described in one or more of the above identified copending incorporated patent applications.

Error Correction Code (ECC) is used internal to each HPSU to provide single-bit error correction and double-bit error detection.

In the embodiment illustrated one or two Scientific Processors SP0 and SP1, labelled 22, can be utilized. If a signle SP is used with a single HPSU, it may be coupled directly to the SP port of such HPSU. When two or more HPSUs are used with an SP, it is necessary to provide a Multiple Unit Adapter (MUA) for each SP. In this configuration MUA0 and MUA1, each labelled 24, are coupled to SP0 and SP1, respectively, across interface lines 26 and 28. MUA0 is coupled to each HPSU through interconnection paths 30, and MUA1 is coupled to each HPSU through interconnection path 32.

Each SP functions under direction of one or more of the IPs to perform scientific type calculations in a support mode. In this regard, the IPs can be considered to be host processors and the SPs can be considered to be support processors, all operating through common storage.

The over-all system maintenance and supervision is accomplished through one or two System Support Processors SSP0 and SSP1, each labelled 34, which are connected to all units of the system. The SSP is available commercially and is utilized in the Sperry Corporation 1100/90 Systems. In general, it is understood that each SSP performs the function of a hardware maintenance panel for the system. The display and setting of information, the activation of most maintenance facilities, selecting modes of operation and the like, is done at the control section of the SSP.

A Clock System 36 is utilized to maintain synchronous operation of the entire system. Clock and synchronizing signals are sent to each IP as will as each HPSU, each IOP, and each SP. The clock interface includes signals and commands from the IP for controlling clock rates, clock mode, cycle count, and other capabilities of the clock. The clock system is novel, and is described in one of the above identified copending patent applications.

Intercommunication between units is essentially on a Request and Acknowledge basis, and the interfaces will be described in more detail as appropriate.

C. High Performance Storage Unit (HPSU)

Figure 2:
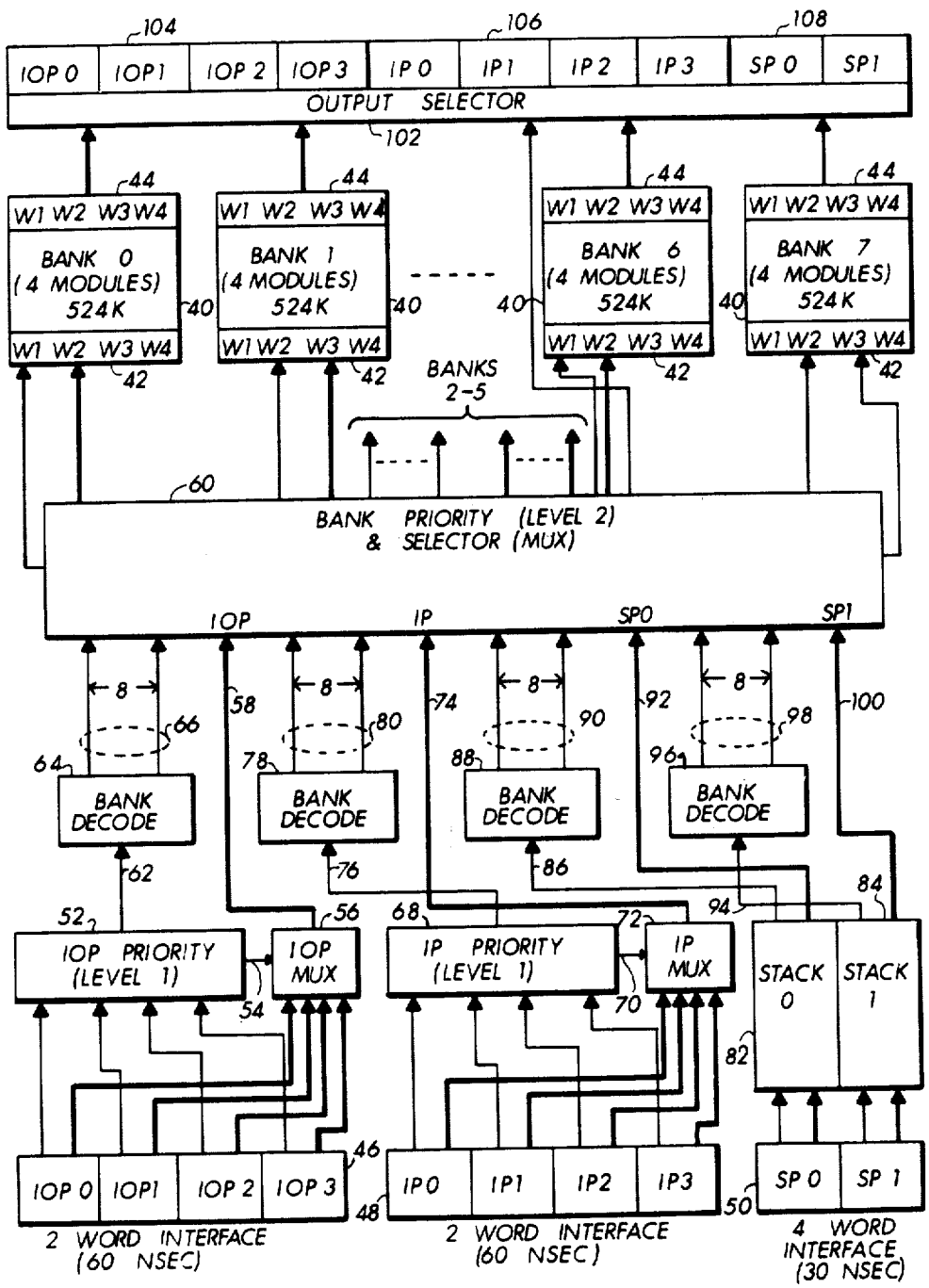
FIG. 2 is a simplified functional blocked diagram of the High Performance Storage Unit.

FIG. 2 is a simplified functional blocked diagram of the High Performance Storage Unit.

The HPSU is a storage device that is commonly accessable by the IPs, the IOPs, and the SPs via the MUAs. The various devices that can be coupled to the HPSU can have differing interface systems and operational rates.

In the preferred embodiment, the HPSU utilizes the eight Banks of storage devices, generally identified as Bank 0 through Bank 7 of which Banks 0, 1, 6, and 7, are illustrated, and each labelled 40 since they are essentially similar. Though not specifically illustrated, each Bank is comprised of four Memory Modules and each Bank has a total capacity of 524 K words. A word in memory is 44-bits, of which 36-bits are data bits and the remaining eight bits are utilized for Error Correction Code (ECC) check bits and parity bits. Each Bank 40 is arranged for receiving four words W1, W2, W3, and W4, labelled 42 for writing, and four such words labelled 44 when read out.

The memory Banks 40 include the addressing circuitry, the storage cells, the timing circuits, and the driver circuits, and can be constructed from commercially available components, it being understood that the accessing rate must accommodate the interface rates with the attached units.

The heavy lines indicate directions of data flow, and the signle lines indicate control flow.

At the input, the HPSU has an IOP interface 46 which can accommodate up to four IOP units, at the four IOP ports labelled IOP0 through IOP3. It also has an IP interface 48 which can accommodate up to four IPs at the four IP ports designated IP0 through IP3. The IOP ports 46 and the IP ports 48 each operate on a two-word interface at a clock rate of 60 nanoseconds.

The HPSU also has an input SP interface 50 which can accommodate two SPs at the two ports labelled SP0 and SP1. The SP ports each function with a four-word simultaneous interface and operate at a clock rate of 30 nanoseconds.

The request and control signals from the IOP ports 46 are passed to the IOP Priority 52, which functions to select the particular IOP to be given priority of access to the memory system. The selection is passed on line 54 to the IOP MUX 56 which functions to select the appropriate data and address information to pass on line 58 to the Bank Priority and Selector (MUX) 60. The control signals provided on control path 62 drive the Bank Decode 64 for selecting one-of-eight control lines 66 for providing control signals for making Bank selection.

In a similar manner, the IP ports 48 provide control signals to the IP Priority 68, which provides control signals on control line 70 to the IP MUX 72 for selecting the data and address signals that will be provided on path 74. Similarly, the control signals on line 76 to the Bank Decode 78 results in signals being provided to select one of eight lines 80 for controlling Bank selection.

The two SP ports 50 are each arranged to store requests in Stack 0 labelled 82, and in Stack 1 labelled 84. SP requests and data are temporarily held in Stack 0 and Stack 1 awaiting availability of the memory system. In essence, Stack 0 and Stack 1 are each a first-in first-out (FIFO) circulating buffer. The request information feeds out of Stack 0 on line 86 to the Back Decode 88 which provides a one-of-eight selction and data passes on line 92 to the Bank Priority Selector 60. Similarly, request information passes on line 94 to the Bank Decode 96 for making selctions on lines 98, while the data passes on line 100.

The Bank Priority and Selector functions to select between the IOP, IP, and the two SP requests presented to it for accessing memory. It also functions to control the Output Selector 102 when reading is to take place.

The HPSU has an IOP output 104 capable of handling four IOP ports IOP0 through IOP3. It also has an IP output 106 capable of handling four IP ports labelled IP0 through IP3. Finally, it has an SP output 108 capable of handling two SP output ports labelled SP0 and SP1. Data rates and timing at the output ports 104, 106 and 108 are similar to those for the input ports previously described.

D. Multiple Adapter (MUA)

Figure 3:
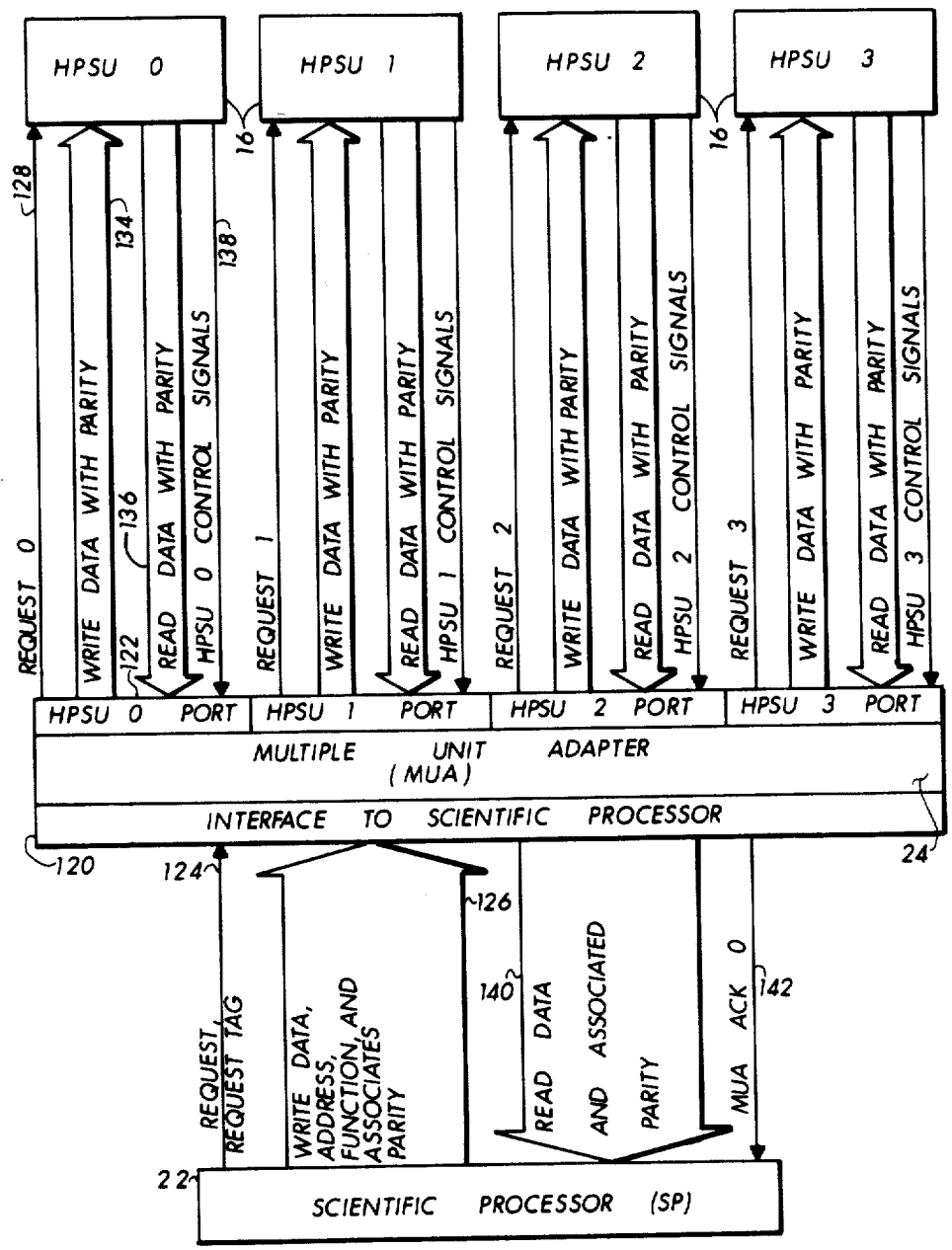
FIG. 3 is a simplified block diagram of the Multiple Unit Adapter (MUA) for providing selective interconnection of a Scientific Processor to one of up to four High Performance Storage Units.

FIG. 3 is a simplified blocked diagram of the Multiple Unit Adapter (MUA) for providing selctive interconnection of a Scientific Processor to one of up to four High Performance Storage Units.

The MUA 24 has an Interface to Scientific Processor 120 and up to four HPSU ports 122, each adapted for interconnection to an associated HPSU 16.

A Scientific Processor (SP) issues Request signals on control path 124 to the MUA. For a write operation, the write data, address, function, and associated parity is provided via cable 126. The MUA can accumulate up to eight request from the SP without acknowledgement, and the requests and the associated data are stored in a first-in first-out (FIFO) stack (not shown).

For purposes of example, if it is assumed that the SP has designated HPSU0, and the request is determined by the MUA to be the next request to be processed, a Request 0 will be provided on control path 128 to HPSU0. Recalling that this will be only one of several requests that can be provided to HPSU0, it will be honored when its priority is selected. If the function is write, the write data with parity will be provided on cable 134. If the function is to read, the read data with parity will be passed from HPSU0 on cable 136 to the MUA. Upon completion of the requested function, the HPSU0 control signals will pass via control path 138 to the MUA. When the MUA establishes that the current request is a read, the read data and associated parity will pass on cable 140 to the SP. As each request is passed on to the selected HPSU, an MUA Acknowledge 0 (ACK 0) nal will be passed on control path 142 to the SP, thereby indicating that the stack has room for one more request.

When the MUA has passed eight requests to an HPSU without acknowledgement the MUA ceases requesting until an Acknowledge 1 (ACK 1) control signal is received in control cable 138.

The control and data path lines for HPSU1, HPSU2, and HPSU3, would function in a similar manner. When the SP reqests access to a different HPSU, all outstanding requests to the first HPSU must be serviced prior to the MUA processing requests to a different HPSU.

All data and control signals from the SP are passed on to the HPSU, and all data and control signals from the HPSU are passed on to the SP with the exception of a few special control signals. The SP data word is four 36-bit words wide. Along with the data field, an address field of 22-bits and a function field of 6-bits are sent with the request. Odd parity is provided for every 9-bits of data, making the SP data word transmission a total of 160-bits, the address field a total of 25-bits, and the function code field a total of 7-bits.

E. Scientific Processor (SP)

Figure 4:
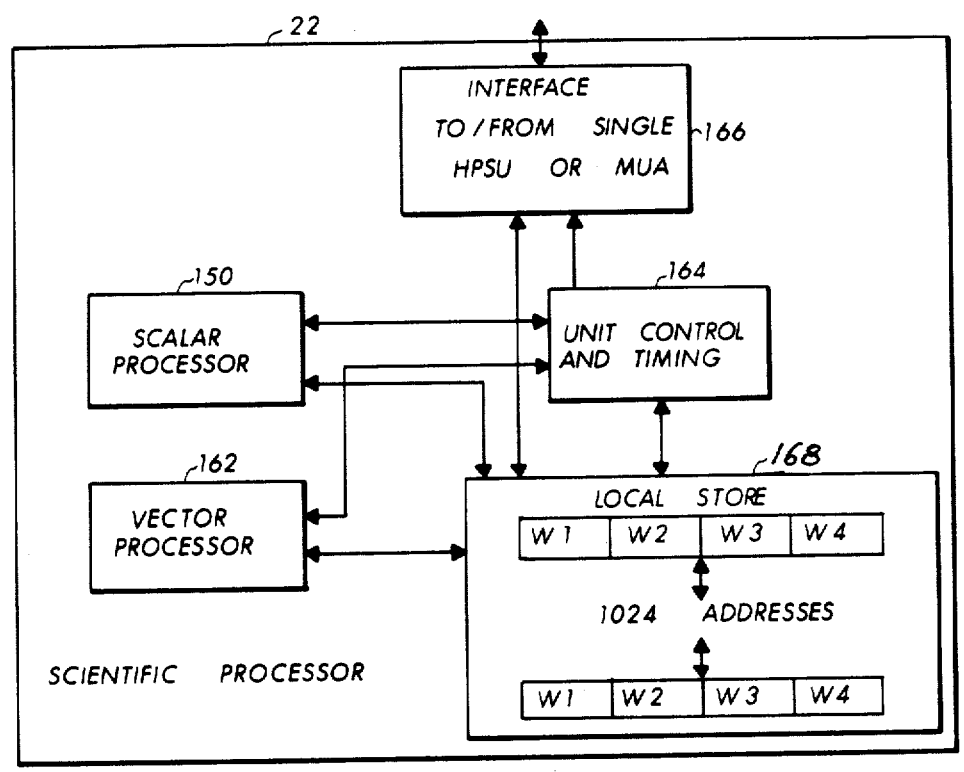
FIG. 4 is a simplified block diagram of the Scientific Processor.

FIG. 4 is a simplified blocked diagram of the Scientific Processor.

Basically, the SP 22 is a subsystem defined as an attached processor of the host system. The SP has been optimized for the high speed execution of floating-point vector arithmetic operations. It is intended to execute user code only and is not intended to run an executive program. It does not require a control program nor does it have any priveledged modes of operation. The SP incldues distinct modules, the Scalar Processor 150, the Vector Processor 162, the Unit Control Timing 164, the Interface 166, and the Local Store 168.

The Vector Processor module 162 performs vector calculations. The Scalar Processor module 150 performs scalar operations, and also has the over-all control function, including instruction fetch and issue. Generally speaking, the Scalar and Vector processor modules operate in parallel although some Scientific Processor instructions require both modules to execute.

The Local Store 168 in the perferred embodiment comprises a high speed random-access memory (RAM) 4,096 words. The arrangement is such that four words W1 through W4 are accessed simultaneously, yielding an addressable range of 1,024 addresses. The Local Store 168 is used primarily for the storage of frequently used scalar variables, and it should be noted is distinguished from the relatively large dedicated memory sections in prior art support processors, the minimal storage being rendered sufficient through the coupling to the plurality of HPSUs.

The general system environment and background described with regard to FIG. 1 through FIG. 4 is set forth to indicate the complexity of the data processing system in which the subject invention may be utilized.

F. Building Blocks

In consideration of the detail logic diagrams of the subject invention, standard building block elements will be utilized. Elements of this type represent circuits and logical functions that are avialable commercially, or can be fabricated by integrated circuit processes that are wellknown.

FIG. 5a is logic block diagram symbol for a Clear Latch. It functions to provide true output Q and complement output $\overline{Q}$ in response to the appropriate combinations of data inputs D or B in conjunction with Enable inputs E1 and E2. The combination of Clear C and Enable E signals will depend upon whether the Latch is to be cleared, or enabled for being responsive to data input signals. A High signal on either data line D or B in conjunction with two Low Enable signals at E1 and E2 will result in a High output signal being provided at Q and a Low output at $\overline{Q}$. It is understood that if the Clear Latch is to be responsive to only a single input signal, that the other input signal will not be shown and can be eliminated from circuit consideration. It is of course understood also that if a larger number of alternative input singals are required, that the circuits can be readily fashioned to accommodate more then two data input lines. If it is desired to clear the Clear Lathc, a High signal at the C input terminal in conjunction with High signals on the Enable lines will result in the state of the Clear Latch being set to the conditions that a Low signal is provided at the Q output terminal, and a High signal is provided at the $\overline{Q}$ output terminal. If only a single Enable condition is required, the second Enable can be tied to a reference enabling signal level, or can be physically omitted from the circuit.

FIG. 5b is a Truth Table for the functioning of the Clear Latch illustrated in FIG. 5a. In the Truth Table representations, L represents Low signals, H represents High signals, and U represents Undetermined conditions.

FIG. 5c is a logic element drawing of the Clear Latch illustrated in FIG. 5a, and illustrates the logical elements and interconnections to accomplish the Clear Latch functions. This logic element drawing illustrates the circuit that utilizes two Enable signals E1 and E2, both of which must be in the Enable condition to cause the circuit to respond to the applied data signals.

FIG. 6a is a logic block diagram symbol for a Set Latch. With respect to data input terminals D or B and the Enable terminals E1 and E2, it functions in a manner similar to that described for the Clear Latch illustrated in FIG. 5a. With regard to the Set condition, the Set Latch functions to provide a High signal at output terminal Q and a Low signal at output terminal $\overline{Q}$ when the Set input line has a High signal applied simultaneously with High signals on Enable input lines.

FIG. 6b is a Truth Table for the functioning of the Set Latch illustrated in FIG. 6a.

FIG. 6c is a logic element drawing of the Set Latch illustrated in FIG. 6a, and illustrates the logical elements and input signal configurations, and the interconnections to accomplish the Set Latch function.

FIG. 7a is the logic block diagram symbol for the two-input Exclusive-OR (XOR). The XOR responds to input signals A and B for providing output signals C and $\overline{C}$. It functions such that a High input signal on either line A or line B, but not both, will result in a High signal at output C and a Low signal at output $\overline{C}$. If both A and B receive Low signals or High signals, the output at C will be Low and the output at $\overline{C}$, thus it can be used as a single-bit comparator.

FIG. 7b is the Truth Table for the Exclusive-OR illustrated in FIG. 7a.

Figure 8:
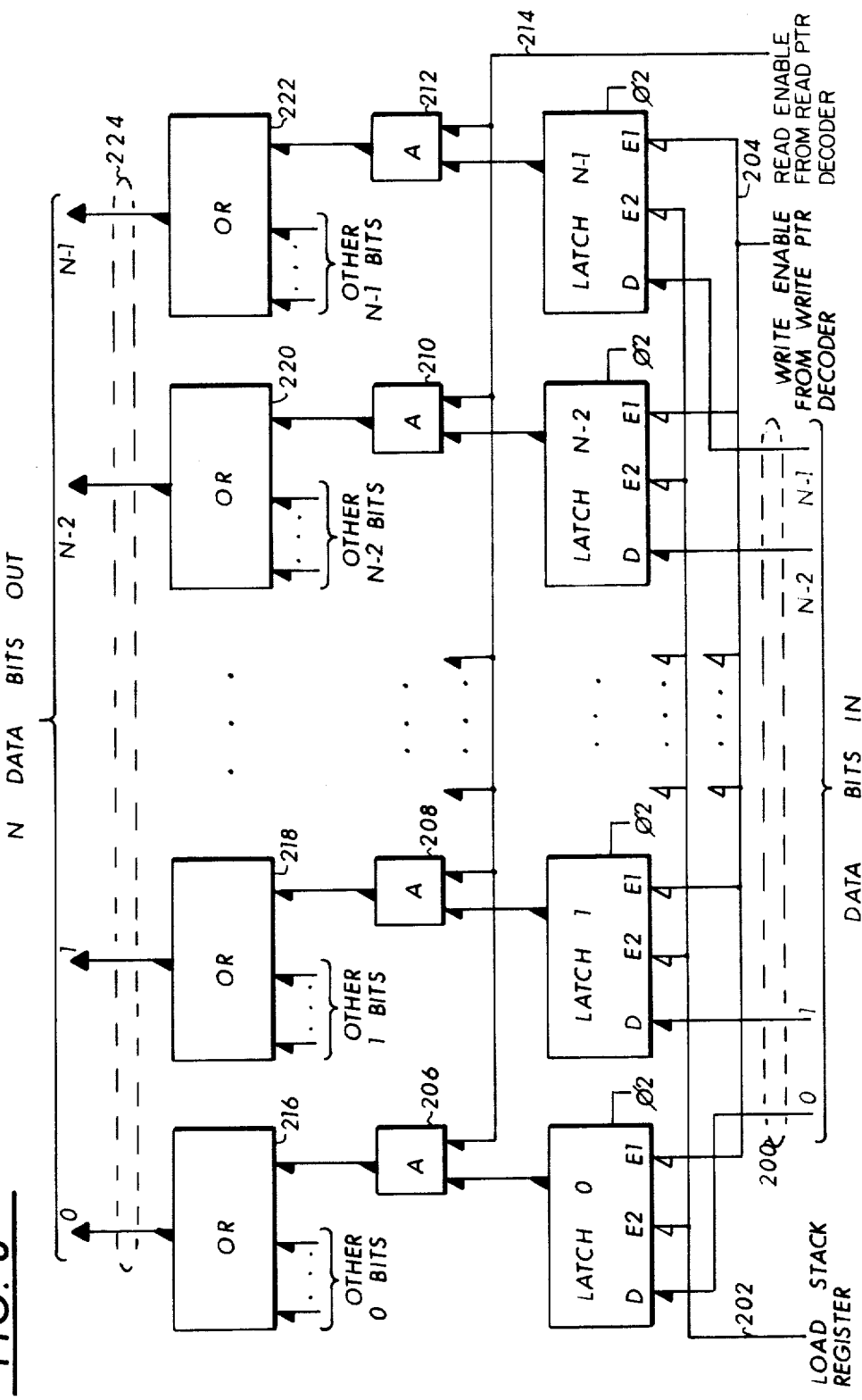
FIG. 8 is a logic block diagram for an N-bit Stack Register with write enable and read enable, together with Stack Register output selection.

FIG. 8 is a logic block diagram symbol for an N-bit stack register with write enable and read enable. This example of an N-bit Register is comprised of Latch circuits identified as Latch 0 through Latch N-1, each adapted for receiving an associated one of the Data Bits In on associated lines 200. The Latches can be selected from the Clear Latch or Set Latch circuits described above. In most situations, the Clear Latch circuits will be utilized in registers. The Latches are dual enabled, with the enable E2 for all Latches provided on line 202 as the enable signal identified as Load Stack Register. Another Enable signal will be applied to the E1 terminals for all Latches will be received on line 204 as a Write Enable in the stack structure. This Write Enable will characteristically be provided from the Write Pointer, as will be described in more detail below. The system is synchronous, and utilizes a four-phase clock circuit and distribution system to time functioning of logical elements. The clocking signals will be described in more detail below. The four-phase clock signals are denoted $\phi 1$ through $\phi 4$. Each Latch circuit in the N-bit register is further enabled by an associated clock pulse, for example $\phi 2$. These clock pulses function essentially as a third Enable signal. The concurrence of the Enables E1 and E2 together with appropriate clock pulse allows the Latches to set to the state of the associated Data Bits In signals. The Latches drive associated AND circuits 206, 208, 210, and 212, respectively. These AND circuits receive Read Enable signals on line 214. When used in a stack structure, the Read Enable signals are characteristically provided by the Read Pointer Decoder, as will be described further below. Each of the AND circuits drive a respectively associated OR circuit 216, 218, 220, and 222. These OR circuits receive like-ordered bits from other Stack Registers, and function to provide the selected N-bit data word out on lines 224.

G. High Performance Pipelined Stack System

In order to interface the Scientific Processor (SP) with the High Performance Storage Unit (HPSU), a four memory word interface operating on a 30 nanosecond interface cycle is utilized. As previously mentioned an SP "data word" is a configuration of bits representing a data field, an address field, and a function field. The four-word SP interface is such that it can accommodate four 36-bit words are used for each SP Request. As indicated above, 144 data bits are utilized in conjunction with a parity bit for each 9-bit grouping of data bits for a total of 160-bits of data across the interface. Parity is checked after transfer and error correction codes are generated for storage in the Memory Modules. As stored, the data words are comprised of 144-bits of data and 8-bits of error correction codes. This circuitry is not shown since it does not add to an understanding of the inventor. Along with the data field, an address field of 22-bits with three bits of parity, and a function field of 6-bits with one bit of parity are sent with the data bits for each request. The word format and bit configurations are set forth in detail in the above identified co-pending application entitled "High Performance Storage Unit".

In FIG. 2 the Stack structures are identified as Stack 0 82 and Stack 1 84. The subject invention is incorporated in each of these Stack Structures.

FIG. 9 is a simplified block diagram of a High Performance pipelined virtual first-in first-out (FIFO) stack structure having a Data Stack with associated Read Pointer and Write Pointers, a Split Control Stack having an associated Split Stack Write Pointer together with a pair of Read Pointers, each for controlling associated groups of Split Control Stack Registers, and Pointer Control circuitry. A Timing Control 230 functions to provide the four-phase clock pulses $\phi 1$ through $\phi 4$ to all of the circuits in the Stack structure. The clock phases and stack sequence signals will be discussed in more detail below. For purposes of the block diagram representation, the appropriate clock phase is associated as is relates to the associated block diagram symbol. The clock phases will be further described and will be illustrated in a consideration of the detail logic circuit diagrams.

In addition to providing the clock phases to the stack structure, the Timing & Control 230 receives a Request Acknowledge from the Memory Modules on line 232. Further, when an Acknowledge is received, it issues an Acknowledge to the Requester on line 234. While these Acknowledge signals are essential in operation of the HPSU, it is not necessary to consider them further with respect to the functioning of the Stack structure.

The Data In is split between two sets of Interface Latches 236 and 238. Interface Latches 236 are associated primarily with the Split Control Stack 240, while Interface Latches 238 are associated primarily with the Data Stack 242. The Data In signals received by Interface Latches 236 on line 244 include the portion of the Address relative to the Bank selection, and are stored on $\phi$4. In the configuration and embodiment described, these Address bits are identified as bits 2, 19, 20, and 21. Further, there is a Request Tag Bit. The Request In is received on line 246, and indicates that there is Data In available for processing. During the same $\phi$4 the Data In signals received on line 248 are stored in the Interface Latches 238. These signals include the data bits with associated parity or error correction code signals, the balance of the Address bits, and the functions bits, each with associated parity. This N-bit grouping is transmitted on line 250 to the Data Stack 242.

The Split Control Stack 240 has a total stack capacity of R, made up of two sets of Split Control Stack Registers that are separately accessed. A first set is designated the Odd Address Stack 252, and the second set is designated the Even Address Stack 254. The Odd Address Stack and the Even Address Stack are each of a capacity of one-half R. In the preferred embodiment, it has been recognized that eight Request In signals can be pipelined in without an Acknowledged read out. Accordingly, R is eight and each of the Stacks 252 and 254 has a capacity of four Request transactions.

The N'-bits from the Interface Latches 236 are provided on line 256 to the odd Address Stack 252 and the Even Address Stack 254, with recording being at the address specified by the Split Stack Write PTR 258.

As each Request In is received, a Request signal is issued on line 260 to Request Latch 262. The Request signal is utilized to advance the Data Stack Write PTR 264 and to advance the Split Stack Write PTR 258 via line 266. The Data Stack Write PTR 264 and the Split Stack Write PTR 258, function via lines 268 and 270 respectively to control the enabling of the appropriate Stack Register for recording the bits from the associated Interface Latches. In the preferred embodiment Data Stack Write PTR 264 is a shift register having R+1 capacity, and the Split Stack Write PTR 258 is a shift register having a capacity R.

Read out from the Data Stack 242 is under control of the Data Stack Read PTR 272 which issues Stack Register selection signals on line 274 to the Read Decoder 276. The Read Decoder selects the appropriate Data Stack Register for read out on line 278.

The read out from the Split Control Stack 240 is under control of two Read PTRs, with Even Address Read PTR 280 providing selection signals on line 282 for selection of the appropriate Stack Register in the Even Address Stack 254. The Odd Address Read PTR 284 provides selection signals on line 286 for selection of the appropriate Stack Register in the Odd Address Stack 252.

As the Bank selection signals are read from the appropriately selected Split Control Stack Register they are passed from the Odd Address Stack 252 on line 288, and are passed from the Even Address Stack 254 on line 290 to the Decode and Bank Priority circuitry 292. This circuitry is described in more detail in co-pending applications entitled "High Performance Storage Unit" and "A Multilevel Priority System", and in general will be understood to decode the Memory Bank signals and to issue Bank Select signals on line 294, together with a Bank Acknowledge signal on one of eight lines 296 to the Read Pointer Control circuitry 300. The Read Pointer Control issues an Advance signal on line 302 for advancing the Data Stack Read PTR 272. The Read Pointer Control will issue an Advance signal on either line 304 to advance the Even Address Read PTR 280, or on line 306 to advance the Odd Address Read PTR 284.

The alternating back and forth of read out of the Odd Address Stack 252 and the Even Address Stack 254 permits the Read PTR for the unselected Stack in the Split Control Stack to be advanced and the Bank selection signals to be decoded for the next Bank selection pending receipt of the Bank Acknowledge signal for the Bank then being selected. These operations and relationships will be described in more detail below with respect to sequence timing diagrams and detail logic circuits.

The Data Stack 242 handles substantially larger numbers of data bits, and is clocked on phase 2 for recording from the clock system, rather then being clocked by the Request In signal. In this manner, for each occurrence of a $\phi$2 signal, the data bits in Interface Latches 238 are written in to the Stack Register specified by the Data Stack Write PTR 264. Since up to eight Request In signals can occur without an Acknowledge, and since there is no provision for determining the relationship of the Data Stack Read PTR 272 and the Data Stack Write PTR 264, it is necessary to provide a over-write protection for the Data Stack 242. This over-write protection is accomplished through the addition of another Data Stack Register, so that Data stored in the Interface Latches 238 can be stored in the extra Stack Register and not over-write a Stack Register that has not yet been read out. This over-write protection will be considered further in relationship to the sequence timing and detail circuit descriptions below.

H. The Timing Sequences

FIG. 10 is a sequence timing diagram illustrating sequences of operation in the improved high performance virtual FIFO stack. A source of Clock pulses 320 generates $\phi$1 322, $\phi$2 324, $\phi$3 326, and $\phi$4 328 wave forms. These Clock pulses, with the driven 4-phase clocking signals occur regularly and are distributed throughout the system. A Request In signal 330 will be latched in the Interface Latches 236 during $\phi$4. An available Request In will be latched in the request Latch 332 during $\phi$2. Data will be latched in the Data Stack and the Split Stack 334 during $\phi$2, with the first Data In going to Stack ADRS 0. A signal to advance the Write PTRs 336 is issued during $\phi$3 so long as there is a current Request In in the Request Latch 262. A Bank Request 338 will be issued on $\phi$3 timing. When the Bank Request signals have been decoded and pass through the Bank Priority circuitry, Bank Acknowledge signals 340 will be timed by $\phi$1. When a Bank Acknowledge signal has been received, the Data Stack is read 342 timed by $\phi$2. Following the receipt of a Bank Acknowledge signal, the Data Stack Read PTR is advanced 344 during $\phi$3. Subsequently the Split Stack Read PTRs are advanced 346 on $\phi$1, alternating between even and odd. The switching between Even and Odd Split Control Stack selection 348 is timed on $\phi$3.

From the consideration of the sequences (see FIG. 9), as will be described in further detail below, it can be seen that the Data Stack 242 has words written therein when available during $\phi$2, and that writing in the Data Stack is not enabled by the Request In. Accordingly, writing will occur at the address specified Data Stack Write PTR 264 each $\phi2$, with a particular Data Stack Register being written over with the same data if the Interface Latches 238 have not been altered. It is not until a further Request In advances the Data Stack Write PTR 264 that the next sequential Data Stack Register will be selected. Since up to eight Request In signals can be processed, or pipelined, without having any been read out, it can be seen that the Data Stack Write PTR 264 will be advanced and ready for the next set of Data In. If the Data Stack had only eight addressable registers, this further advance would cause the address of the Data Stack Registers to advance circularly to the first address, and if an Acknowledge had not been received, would cause the first Data Stack Register in the sequence to be written over. In order to alleviate this potential error condition, a ninth Data Stack Register is imployed so that at least eight Data Stack Registers are protected from over-writing at all times.

The sequence signals indicate that the Split Control Stack 240 alternates under control of the Bank Acknowledge signals 340 to alternately advance the Split Stack Read PTRs 346 through the switching of control of the Even and Odd selection during $\phi3$. In this way, the Bank Request read from the first Even Stack Register will be selected for read out and decode. As soon as the Bank Acknowledge signal 340 is issued, the next Bank Request can be read out from the first Odd Stack Register for decoding and prioritization. While the Odd Address Stack Register is being decoded and prioritized, the Even Address Read PTR is advanced, the next address in the Even Address Stack is selected and available for decoding. The occurrence of the next Bank Acknowledge causes the Read Pointer Control 300 to switch and advance the Odd Address Read PTR for selecting the next sequential Odd Address Stack Register. In this manner, the advancement of the appropriate Read PTR and the decoding for the next Stack Register can go on concurrently with the completion of the prioritization and issuance of the Bank Acknowledge from the current reference. By thus interleaving the control and selection of the Bank Request accessing between the Even Address Stack 254 and the Odd Address Stack 252, the functioning of the entire Stack structure is enhanced, permitting the functional through-put required to support the Scientific Processor with the 30 nanosecond interface cycle.

I. Data Stack

I.1 Data Stack Registers

Figure 11A:
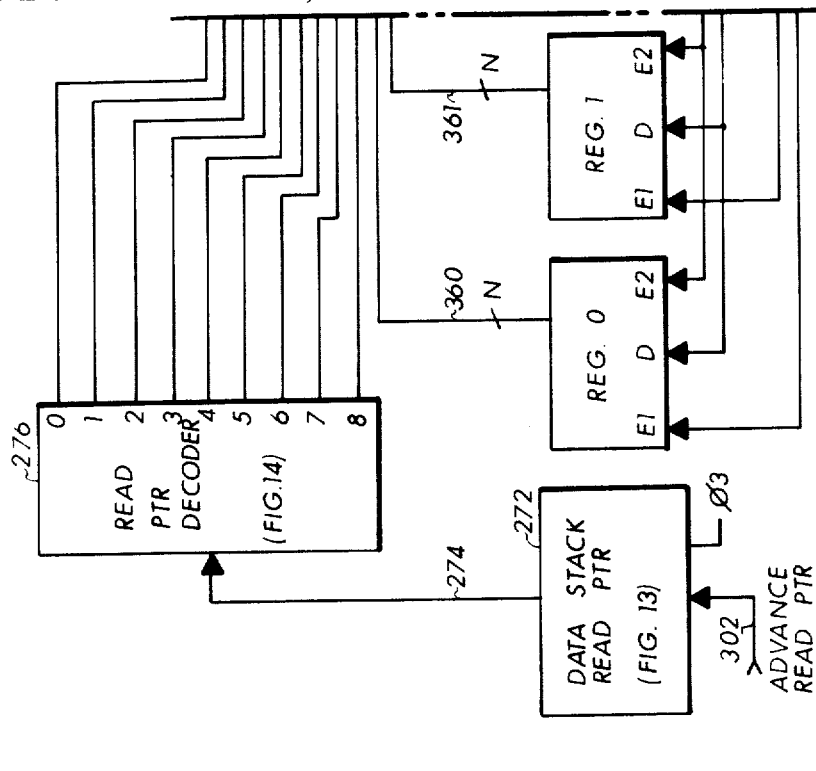
FIG. 11 is a logic block diagram of a Data Stack; with over-write protection.

FIG. 11 is a logic block diagram of a Data Stack with over-write protection. In the preferred embodiment, the Data Stack includes nine N-bit Data Stack Registes identified as REG. 0 through REG. 8. As previously described, the Data In is received on line 248 and is stored in the Interface Latches 238 on $\phi4$. The Data In is provided on lines 250 as common inputs to all of the Data Stack Registers. The Data Stack Registers can be of a construction as described in FIG. 8.

The selection of one and only one of the Data Stack Registers is accomplished by the Data Stack Write PTR 264, which in the preferred embodiment is a 9-stage shift register that will be described in more detail in FIG. 12. Functionally, the Data Stack Write PTR responds to the Advance Write PTR signals received on lines 266, when clocked by $\phi3$, to issue Enable pulses on one and only one of lines 268 to the respectively associated ones of the Data Stack Registers. These Enable signals are directed to respectively associated ones of the E1 Enable terminals for the Data Stack Registers. As previously described in general, each of the Data Stack Registers are also enabled by a $\phi2$ signal applied on line 350 to the E2 Enable terminals for each Register. It can be seen, then, that as long as the Data Stack Write PTR 264 selects a particular Register, that it will continue to over-write the Data In signals held in the Interface Latches each time the $\phi2$ signal occurs.

To read the Data Stack out, the Data Stack Read PTR 272 issues Data Stack Register identifying signals on line 274 to the Read PTR Decoder 276. The specific circuitry of the Data Stack Read PTR will be described in detail with reference to FIG. 13, and the Read PTR Decoder will be described and illustrated in FIG. 14. The Read PTR Decoder 276 operates to provide an enabling signal on one and only one of its output lines collectively referenced as lines 352, for respectively enabling an associated N-bit AND circuit. The N-bit AND circuits A0 through A8 respectively receive the N-bit data word stored in the associated Data Stack Register, with A0 coupled to line 360, A1 coupled to line 361, A2 coupled to line 362, A3 coupled to line 363, A4 coupled to line 364, A5 coupled to line 365, A6 coupled to line 366, A7 coupled to line 367, and A8 coupled to line 368. The N-bit AND circuits are coupled to OR circuit 354 which provides the n-bit output on line 278 to the Memory Modules. As previously indicated, each time an Advance Read PTR signal is received on line 302, the Data Stack Read PTR 272 is advanced.

I.2 Data Stack Write Pointer

Figure 12B:
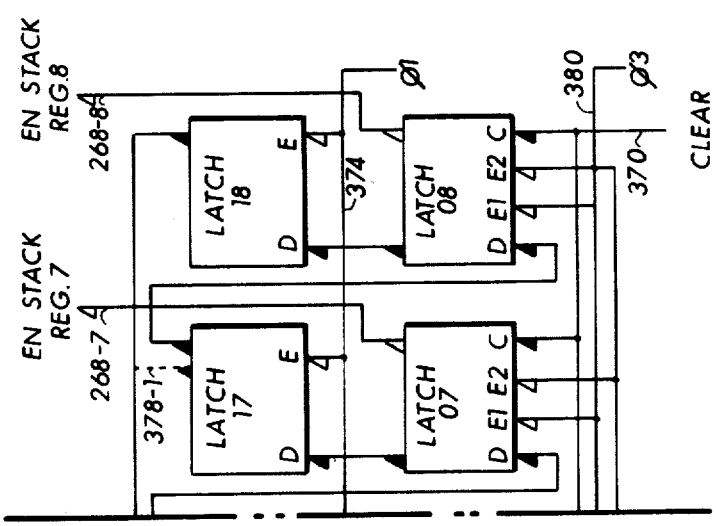
FIG. 12 is a logic block diagram of the Write Pointer utilized in the Data Stack illustrated in FIG. 11.

FIG. 12 is a logic block diagram of the Write Pointer utilized in the Data Stack illustrated in FIG. 11. The Data Stack Write PTR is essentially a 9-stage shift register comprised of two ranks of Latches. The first rank of Latches, designated sequentially Latch 00 through Latch 08 includes a Set Latch in the Latch 00 position, with all other Latches in the first rank being Clear Latches. Accordingly, when a Clear pulse is provided on line 370 to all Latches in the first rank, Latch 00 will be Set to provide a High signal on line 372 with a Low enable on line 268-0. All other Latches in the first rank will be Cleared and will provide disabling High signals on respectively associated lines 268-1 through 268-8.

A second rank of Latches, designated sequentially Latch 10 through Latch 18, is arranged to be enabled by a $\phi1$ signal on line 374, and each are arranged to receive an input signal from a respectively associated Latch in the first rank. For example, Latch 10 receives its input signal from Latch 00 on line 372.

Each Latch in the second rank has its true output terminal coupled to the D input terminal of the next higher ordered Latch in the first rank. For example, Latch 10 has its output terminal coupled via line 376 to the D input terminal of Latch 01. This interconnection process continues in order to the highest ordered rank of Latches, where Latch 18 has its true output terminal coupled via line 378 to the D input terminal of Latch 00, thereby providing the end-around function that causes the entire Write Stack Pointer to function circularly and continuously to enable the Stack Registers as a virtual FIFO stack.

At this juncture it will be noted that for the Split Stack Write PTR 258, exactly the same type of structure is utilized, with the exception that Latch 08 and Latch 18 are not required, and the end-around connection is made from the true output terminal of latch 17 indicated by dashed line 378-1.

The first rank of Latches is enabled by the Request Latch 262 providing a Low signal on line 266 to the E2 terminals, simultaneously with a $\phi 3$ signal being provided on line 380 to each of the E1 terminals. In this manner, each time a Request signal is received on line 260, it is latched during $\phi 2$ by the Request Latch 262, and in conjunction with the $\phi 3$ pulse signal causes the shift register to advance the Low Enable along the shift register.

By way of explanation of the circuit operation, it will be recalled that when the Clear pulses are applied on line 370 initially, that Latch 00 is Set, and provides the High signal on line 372. Accordingly, when the next $\phi 1$ signal occurs, the High signal will set Latch 10 to provide a High signal on line 376. At the same time, Latch 18 will be providing a Low signal on line 378 to the D input terminal of Latch 00. When the next sequence of Enables is present, the High signal on line 376 will Set Latch 00, thereby switching line 268-1 Low and providing a High signal on line 382. Simultaneously, the Low signal on line 378 will cause Latch 00 to switch and provide a High disable signal on line 268-0. It will be apparent to one skilled in the art how the Low Enable signals propagate along the shift register.

I.3 Data Stack Read Pointer

Figure 13:
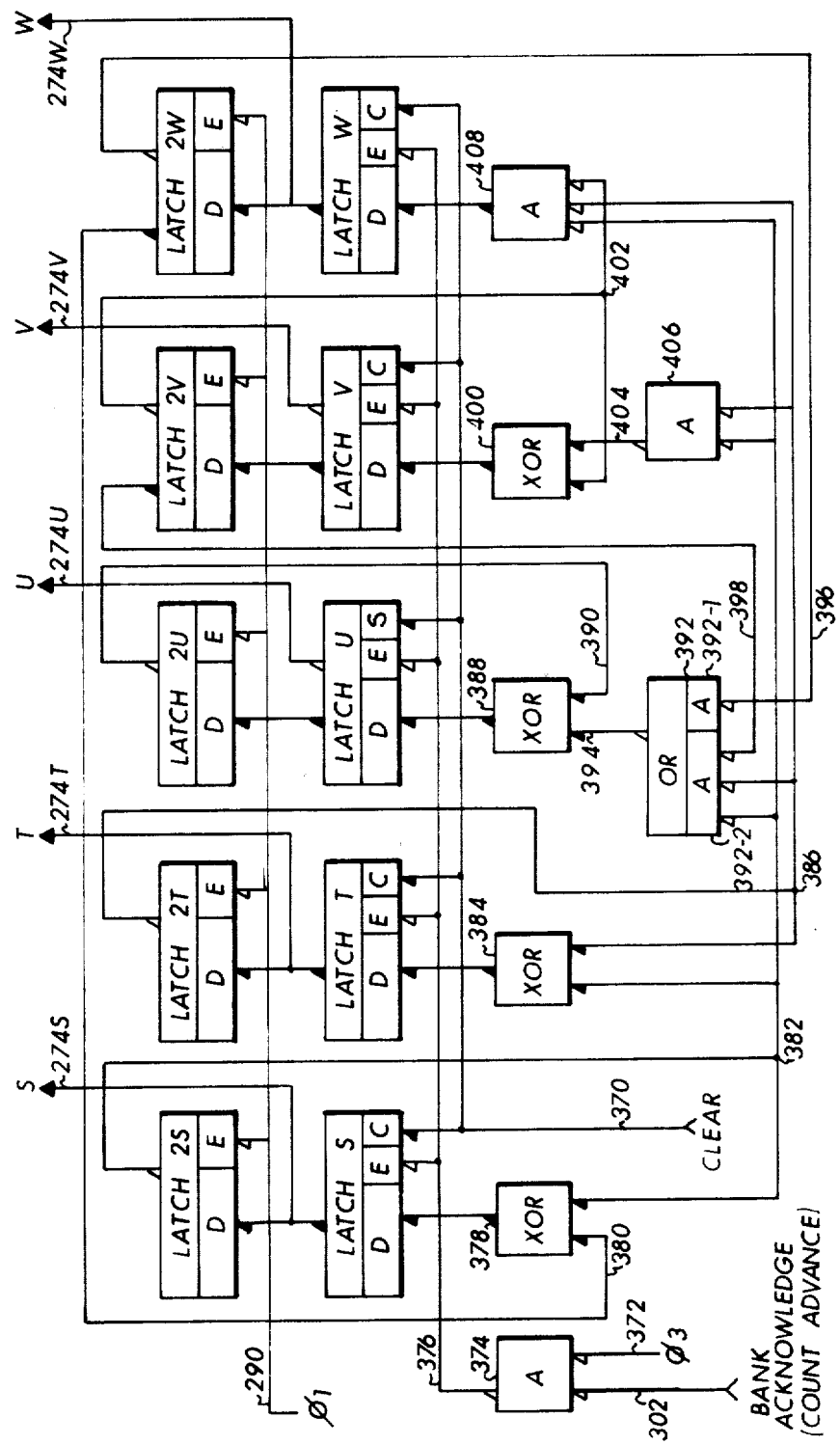
FIG. 13 is a logic block diagram of a Read Pointer utilized in the Data Stack illustrated in FIG. 11.

FIG. 13 is a logic block diagram of a Read Pointer utilized in the Data Stack illustrated in FIG. 11. The Data Stack Read PTR is not a simple binary counter, nor can a shift register be imployed. Instead, it is a specialized circuit that accommodates the configuration of the Data Stack having R+1 Data Stack Registers. In particular, it accounts for nine Data Stack Registers in a circular virtual selection fashion.

The Data Stack Read Pointer is comprised of a first rank Latches designated as Latches S, T, U, V, and W. As indicated, Latches S, T, V, and W are Clear Latches while Latch U is a Set Latch. Accordingly, when a Clear signal is provided on line 370, it results in Low signals on output lines 274 S, 274 T, 274 U, and 274 W, with a High signal on line 274 V.

A second rank of Latches 2S, 2T, 2U, 2V, and 2W is arranged such that each Latch in the second rank is driven by an associated Latch from the first rank, when Enabled by $\phi 1$ applied line 290. The second rank of Latches is utilized to provide the combinatorial signals for use in providing the combination of signals to identify the Data Stack Registers.

FIG. 15 is a function table illustrating Data Stack Register selections for the Read Pointer u utilized in the Data Stack illustrated in FIG. 11. Further, it identifies the signal combinations for terminals S through W that must prevail when applied to the Read Pointer Decoder that makes the final Data Stack Register selection. It will be noted that W is used within the Data Stack Read Pointer only and is not needed at the Read PTR Decoder. Latch W and Latch 2W with associated control lines are utilized to advance the ninth count and to provide end-around control of the Data Stack Read PTR.

To advance the Data Stack Read Pointer, a Low signal on line 302 representing a Bank Acknowledge is used. When the Bank Acknowledge is present during $\phi 3$ clock pulse on line 372, Low AND 374 is satisfied and issues a Low Enable on line 376 to all of the first rank Latches.

Latch S is driven by XOR 378, which in turn receives the true output from Latch 2W on line 380 and the complement output from Latch 2S on line 382.

Latch T is driven by XOR 384, which receives its input from the complement output of Latch 2S on line 382, and the complement output of Latch 2T on line 386.

Latch U is driven by XOR 388, which receives one input from the complement output terminal of Latch 2U on line 390, and the output of Low AND/OR circuit 392 on line 394. Low AND 392-1 is driven by the complement output terminal of Latch 2W on line 396. Low AND 392-2 is driven by the complement output terminal of Latch 2S on line 382, the complement output terminal of Latch 2T on line 386, and the true output of Latch 2V on line 398. When either the input to AND 392-1 is Low or all of the input signals to AND 392-2 are Low, or both conditions prevail, the output signal on line 394 will be Low.

Latch V is driven by XOR 400, which is driven by the complement output terminal of Latch 2V on line 402, and the output on line 404 from Low AND circuit 406. Low AND 406 is driven by the complement output of Latch 2S on line 382, and the complement output terminal of Latch 2T on line 386.

Latch W is driven by Low AND 408, which receives input signals from the complement output terminal of Latch 2S on line 382, from the complement output terminal of Latch 2T on line 286, and from the complement output terminal of Latch 2V on line 402.

In operation, then, it will be seen that when the first rank of Latches is cleared, indicating the initial state, Latch S will provide a Low at line 274S; Latch T will provide a Low at output 274T; Latch U will provide a Low at output 274U; Latch V will provide a High at output 274V; and Latch W will provide a Low at output 274W. Referring to FIG. 15, it will be seen that this combination of signals satisfies the conditions to reference Data Stack Register 0. With this configuration, Latch 2W will provide a Low signal on line 380 to XOR 378, and Latch 2S will provide a High signal on line 382 to XOR 378. This difference of signal levels will result in XOR 378 providing a High signal to Latch S. Therefore, when the Bank Acknowledge and $\phi 3$ coincide, Latch S will be Enabled, and will be set to provide a High output signal on line 274S. Tracing through the logic combinations for the other Latches will indicate that the remaining Latches T, U, V, and W do not switch. Accordingly, this configuration satisfies the output requirements for identifying Data Stack Register 1. In this regard reference is again made to FIG. 15. It is not deemed necessary to trace through all other combinations, since this will be readily apparent to those skilled in the art.

A consideration of FIG. 15 will indicate that signals U, T, and S are similar to a binary count for Stack Addresses 0 through 7. Similarly, output W resembles a binary count for all Stack Addresses. V and U are basically the inverse of each other except for the combination when addressing Stack Register 8. The primary difference between the Data Stack Read Pointer as illustrated in FIG. 13 and a straight binary counter occurs in the circuitry necessary to accommdate addressing of the Data Stack Register 8 (the ninth address) and the switching that must occur to cause the addressing to be circular to again access Data Stack 0 after addressing Data Stack Register 8.

I.4 Data Stack Read Pointer Decoder

FIG. 14 is a logic block diagram of the Read Pointer Decoder utilized in the Data Stack illustrated in FIG. 11. As described above, it receives input signals from the Data Stack Read Pointer in combinations identified in FIG. 15 for identifying the specific Data Stack Registers to be accessed. The Read Pointer Decoder is comprised of four Latch circuits 410, 412, 414, and 416 with AND circuit 418 for selecting Data Stack Register 8 via line 420. The Driver circuits drive AND circuits 422, 424, 426, 428, 430, 432, 434, and 436 in various combinations to provide the selecting output signals on the output lines to select Data Stack Registers 0 through 7.

The S input signal is applied on line 274S as the input to Driver 410 and to the input of Driver 414. The T input signal is applied on line 274T to the input terminal of Driver 412 and to the input terminal of Driver 416. The U input signal is applied on line 274U as the Enable signal through Inventer 421 for output from 410 and 412 through AND circuits 422, 424, 426, and 428, and is applied as one of the input signals to AND 418. The V input signal is applied on line 274V as the Enable signal through Inventoer 429 for output from Drivers 414 and 416 through AND circuits 430, 432, 434, and 436, and is applied as one of the input signals to AND 418.

In this configuration it can be seen that when V is High output from Drivers 414 and 416 through AND circuits 430, 432, 434, and 436 will be disabled. Similarly, when U is High, output from Drivers 410 and 412 through AND circuits 422, 424, 426, and 428 will be disabled. Then both U and V are High, the input signals to AND 418 will be High, and will satisfy the Low Enable output requirements on line 420 to select Data Stack Register 8. When U goes Low, it Enables output from Drivers 410 and 412 through AND circuits 422, 424, 426, and 428, thereby Enabling the selection of Addresses for Data Stack Registers 0 through 3. In a similar fashion, when V is Low, it Enables output from Drivers 414 and 416 through AND circuits 430, 432, 434, and 436, thereby allowing the selection of Data Stack Registers 4 through 7 depending upon the combination of input signals S and T.

It will be recalled from above that W need not be applied to the Read PTR Decoder since Data Stack Register 8 is uniquely identified and selected via High U and V signals. (See FIG. 15)

To consider an illustrative example, if it is assumed that Data Stack Register 0 is to be selected, it will be seen that the input signals to the Read Pointer Decoder should require a Low on the S, T, and U input terminals with a High on the V input terminal. If these input conditions are satisfied it will be seen that the Low at the V input terminal will disable AND 418 resulting in a disabling High on line 420. A High at input V will disable output from Drivers 414 and 416, which when traced through AND circuits 430, 432, 434, and 436 will result in High signals at output terminals 4, 5, 6, and 7. These High signals disable Data Stack Registers 4 through 7. A Low at input terminal U will enable decoding through Drivers 410 and 412. A Low input at input terminal S and input terminal T will result in Driver 410 providing a Low on output line 440 and a High on output line 442. The Low on line 440 will disable AND circuits 442 and 424 resulting in disabling High signals on lines 3 and 2 respectively. The High on line 442 will provide activating signals to AND circuits 426 and 428. Simultaneously, the Low applied to Driver 412 will result in a Low signal being provided on line 444 to AND circuits 426 and 422. The Low signal to AND 426 disables it, and causes a High output signal on Data Stack Register line 1 thereby disabling it. Finally, Driver 412 provides a High signal on line 446 to AND 428 and AND 424. This results in the application of two High signals to AND 428, and satisfies its activating requirements to provide a Low Enable to select Data Stack Register 0. Other combinations can be traced through the logic by those skilled in the art, and it is not deemed necessary to trace out each example of the signal combinations defined in FIG. 15.

J. Read Pointer Control

Figure 16:
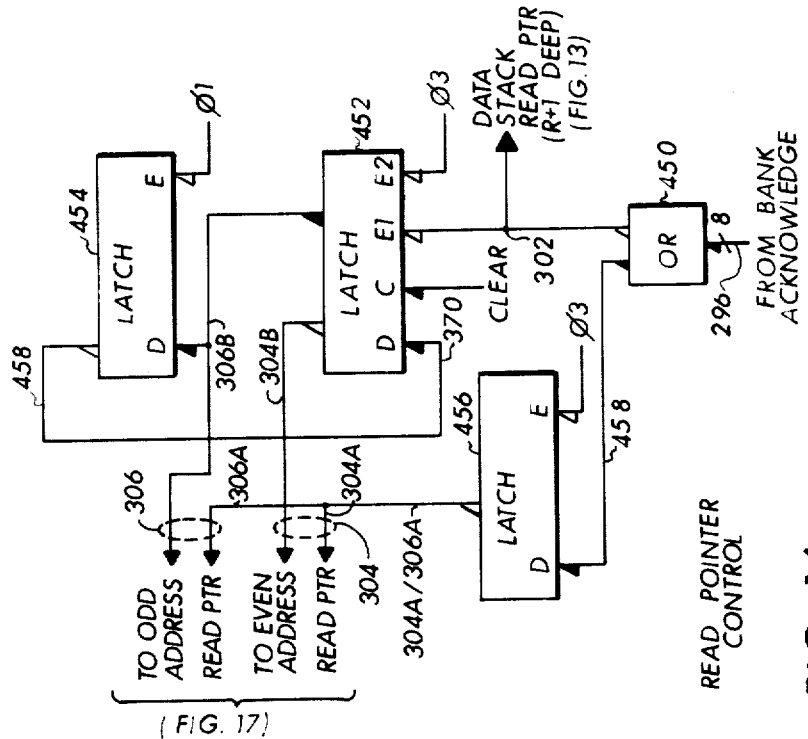
FIG. 16 is a logic block diagram of the Read pointer Control circuitry.

FIG. 16 is a logic block diagram of the Read Pointer Control circuitry. This was illustrated in FIG. 9 as block element 300. The eight Bank Acknowledge signals are applied on line 296 to OR 450. Whenever a Bank Acknowledge signal is present, a Low signal will issue on line 302 to act as one of the Enable signals for Latch 452, and to act as the count Advance signal for the Data Stack Read PTR illustrated in Detail in FIG. 13, and described in general in FIG. 9 and FIG. 11. The functioning of the Data Stack has been described in detail and will not be referenced further.

The balance of the control of the Read Pointer Control 300 is directed to controlling the Split Control Stack 240 (see FIG. 9). In addition to Latch 452, this control circuitry involves Latch 454 and Latch 456.

Latch 456 is utilized to determine the presence of a Bank Acknowledge and is driven by a signal received on line 458 from OR 450, and results in Latch 456 being set to provide a Low output signal on line 304A/306A when Enabled by $\phi 3$. This Low signal will be utilized as one of the Enable signals for the Even Address Read PTR 280 and the Odd Address Read PTR 284 illustrated in FIG. 17.

Latch 452 is a Clear Latch and will initially be cleared through application of the Clear pulse via line 370. This will result in a High output signal on line 304B and a Low signal on line 306B. The High signal on line 304B will result in the readout of the first Even Address Split Stack Register, and will simultaneously disable advancing the Even Address Read PTR 280. At the next $\phi 1$, the Low signal on line 306B will switch Latch 452 resulting in a High signal on line 458 being applied to the Data input terminal of Latch 452. Upon the occurrence of the next Bank Acknowledge, Latch 452 will be switched to provide a High signal on line 306B for enabling the read out of the first Split Stack Register in the Odd Stack while disabling advancement of the Odd Address Read PTR. The Low signal on line 304B will disable read out from the Even Stack and will enable advacement of the Even Address Read PTR 280. It is clear, then, that this alternate switching of Latch 452 and Latch 454 results in the interleaved selection for read out between the Odd Address Stack 252 and the Even Address Stack 254 together with the alternated advancement of the Odd Address Read PTR 284 and the Even Address Read PTR 280, all in response to the Bank Acknowledge signals.

K. Split Control Stack

K.1. Split Control Stack Register And Control

Figure 17A:
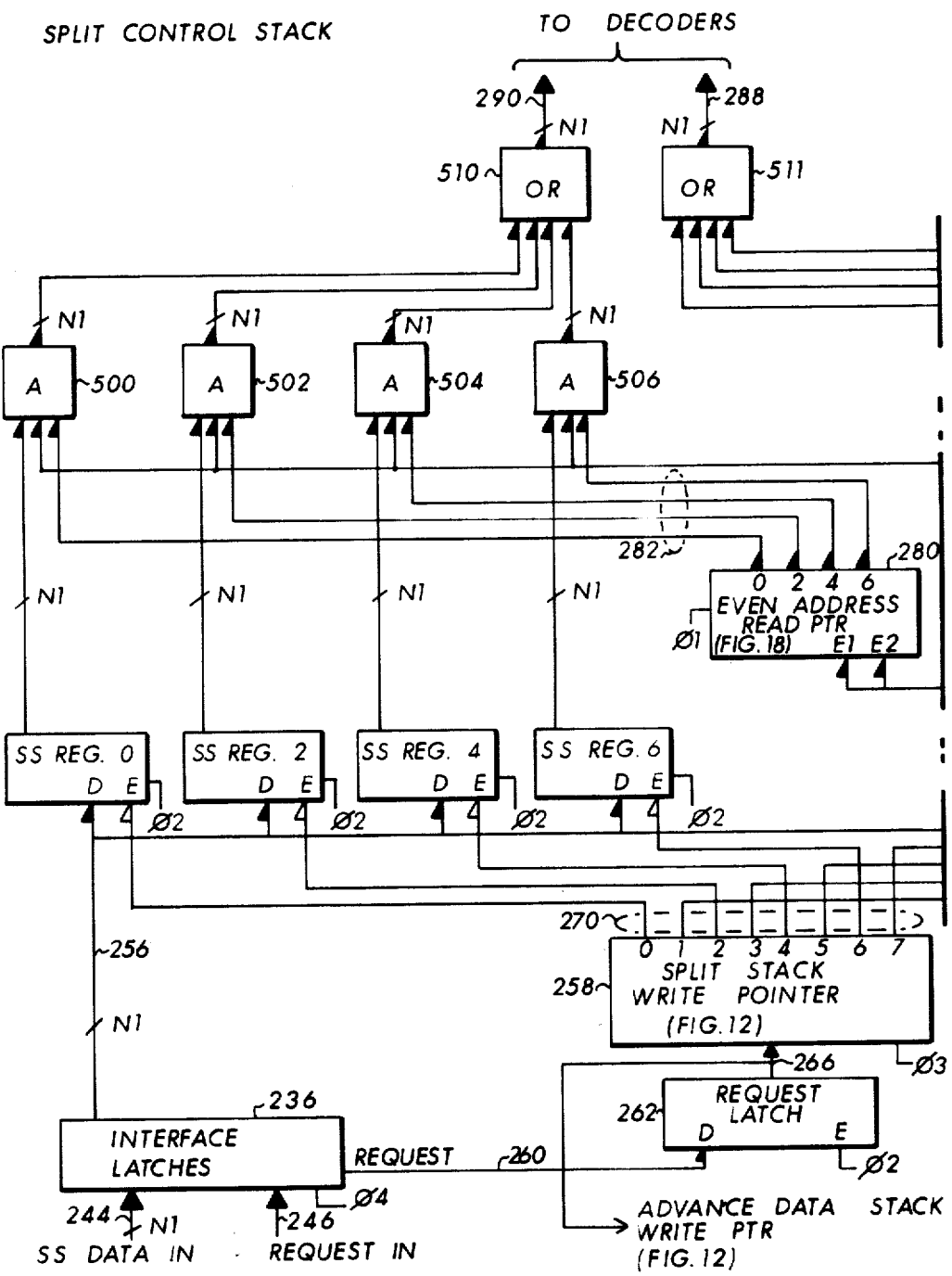
FIG. 17 is a logic block diagram of the Split Control Stack portion of the improved stack structure.

FIG. 17. is a logic block diagram of the Split Control Stack portion of the improved stack structure. In this representation, the Split Stack Registers are denoted as Odd and Even. Split Stack Registers designated SS Registers 1, 3, 5, and 7 comprise the Odd Address Stack 252, and SS Registers O, 2, 4, and 6 being the Even Address Stack 254. (See FIG. 9)

As previously described, the Interface Latches 236 receive the Split Stack Data In on line 244 and includes the Request In received on line 246, all during φ4. The Request is provided on line 260 to the Request Latch 262 where it is utilized to provide the Enabling signal on line 266 to Advance the Data Stack Write PTR (see FIG. 12) and to Advance the Split Stack Write Pointer 258. It will be recalled that this Split Stack Write Pointer is an 8-stage shift register of the type described in FIG. 12, and functions to provide a Low Enable on one and only one of its output terminals 0 through 7 in response to each Advance pulse. These output signals are provided on lines 270 to a respectively associated one of the SS Registers and Enables writing of the Data In in the selected SS Register. Writing is alternated between the Even Address Stack Registers and the Odd Address Stack Registers.

Each of the SS Registers has output lines associated with output gates identified as AND circuits 500 through 507. The Even Address Read PTR 280 is basically a 4-phase shift register which will be described in further detail in regard to FIG. 18, that provides Enabling signals on lines 280 such that output terminals 0, 2, 4, and 6 sequentially Enable respectively associated ones of the AND circuits 500, 502, 504 and 506. When Enabled by a signal on line 304B from the Read Pointer Control, the selected AND circuits 500, 502, 504 and 506 provide readout from the associated SS Register to OR 510, which in turn provides the selected output signals on lines 290 to the associated Bank Decoder. In a similar fashion, the Odd Address Read PTR 284 provides Enabling output signals on lines 286 from output terminals 1, 3, 5, and 7 to respectively associated AND circuits 501, 503, 505, and 507. When these AND circuits are enabled by a signal received on line 306B from the Read Pointer Control 300, the selected SS Register will be read out to OR circuit 511, thereby providing the output signals selected on lines 288 to the selected Bank Decoder.

Advancement of the Even Address Read PTR 280 is under control of the Advance Read PTR signals received on lines 304 from the Read Pointer Control 300, illustrated in detail in FIG. 16. Similarly, the Odd Address Read PTR 284 is advance under control of signals received on lines 306 from the Read Pointer Control.

K.2 Split Control Stack Read Pointer

Figure 18:
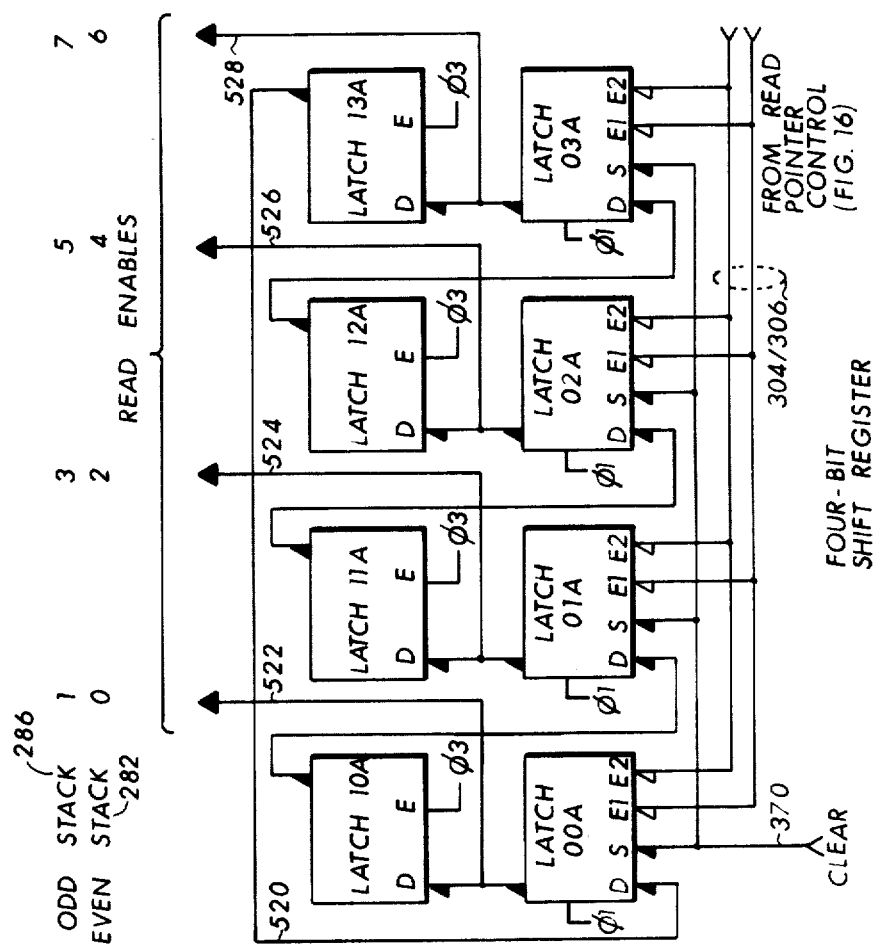
FIG. 18 is a logic block diagram of a four-stage shift register utilized as the Even Address Read Pointer and Odd Address Read Pointer in the Split Control Stack illustrated in FIG. 17.

FIG. 18 is a logic block diagram of a four-stage shift register utilized as the Even Address Read Pointer and Odd Address Read Pointer in the Split Control Stack illustrated in FIG. 17.

The four-stage shift register is comprised of a first rank of Latches 00A, 01A, 02A, 03A, of which Latch 00A is a Set Latch and the other three are Clear Latches. A second rank of Latches designated 10A, 11A, 12A, and 13A are utilized to provide input signals to the next higher ordered Latches in the first rank, with the exception of Latch 13A, which provides the end-around connection by line 520 to the Data input terminal of Latch 00A. This end-around interconnection provide circular operation.

A separate shift register, such as that illustrated, is required for the Even Address Read PTR 280 and the Odd Address Read PTR 284 circuits.

When initialized, by issuance of a Clear pulse on line 370, Latch 00A will provide a High output on line 522, and Latches 01A, 02A, and 03A will provide Low disabling signals on output lines 524, 526 and 528, respectively. It is of course understood that output lines 522, 524, 526, and 528 will be output lines 282 for the Even Address Read PTR 280, and will be output lines 286 for the Odd Address Read PTR 284.

After the shift register is initialized, the count is advanced by the application of the appropriate Low Enable signals on linee 304/306 derived from the Read Pointer Control. (see FIG. 16) It is of course apparent that the setting of the first rank of Latches occurs during φ1, and that the enabling of switching of the second rank Latches occurs during φ3 such that the second rank Latches have time to stablize for application of their output signals to the associated Latches in the first rank.

L. Summary

From a consideration of the foregoing descriptions of the preferred embodiment, and the drawings, it can be seen that the various stated objectives and purposes of the invention have been achieved. An improved stack structure having a high performance pipelined Data Stack with over-write protection is described in conjuction with a Split Control Stack that is pipelined. Operation is interleaved for receiving and storing Memory Bank Request signals associated with data words stored in the Data Stack. The Split Control Stack utilizes an Even Address Read Pointer and an Odd Address Read Pointer under control of Read Pointer Control circuitry to alternate selection for reading between the Even Address Stack Registers and the Odd Address Stack Registers. The interleaving of reading in the Split Control Stack results in interleaved decoding of the Bank Select signals and advancement of the Read Pointers to provide materially enhanced operation. It is of course understood that various changes in logical circuit arrangement, circuit selection, and functionality will become apparent to those skilled in the art after having considered the teaching, without departing from the spirit and scope of the invention. Accordingly, what is intended to be protected by Letters Patent is set forth in the claims.

We claim:

1. For use in a high performance storage unit capable of pipeline interaction with multiple requesting units, and having a plurality of addressable memory banks, memory bank access control circuitry for decoding, prioritizing, and issuing bank acknowledge signals in response to applied bank selection signals, a clock signals distributed in the unit, and capable of pipelining up to R requests for access to the memory banks without having received an acknowledge signal indicating that an access has been completed, a high performance virtual first-in first-out pipelined data stack structure comprising:

request receiving means for receiving request in signals from an associated requester;

bank acknowledge receiving means for receiving bank acknowledge signals;

interface means for receiving data words to be written in memory banks at addressable locations;

split control stack means including a first set of ½R split stack register means and a second set of ½R split stack register means, said first and second sets of split stack register means for alternately storing sequential bank selection signals and request in signals between said first set and said second set;

split control stack write control means responsively coupled to said request in receiving means for causing said bank selection signals to be alternately stored in successively addressed ones of said split stack register means in response to successive ones of said request in signals;

split control stack read control means coupled to said bank acknowledge receiving means for causing alternate readout from successively addressed ones of said split stack register means.

2. A split control stack as in claim 1 wherein said split stack write pointer means comprises:

write enable shift register means coupled to said request receiving means and having output terminals each for enabling an associated one of said split control stack register means alternating said enabling between said first set and said second set in response to successive ones of said request in signals.

3. A split control stack as in claim 1 wherein said split control stack read control means includes:

first read address pointer means coupled to said first set of split control stack registers for enabling read out of the selected one of said first set of split control stack registers; and second read address pointer means coupled to said second set of split control stack registers for enabling read out of the selected one of said second set of split control stack registers.

4. A split control stack as in claim 3 wherein said split control stack read control means further includes:

read address pointer control means responsively coupled to said bank acknowledge receiving means for alternately advancing said first read address pointer means and said second read address pointer means for interleaving selection of memory bank selection signals from said first and said second sets of split control stack registers.

5. In a high performance storage unit having a plurality of addressable memory banks, bank priority and bank decoding selection circuits operative to provide bank acknowledge signals in response to bank request signals, a pipelined data stack for storing data words, addresses, and function relative to said memory banks, a split control stack comprising:

request receiving means for receiving requests for access to the memory banks;

input means for receiving data input signals indicative at least in part of memory banks selection signals associated with data words addressed;

a first set and a second set of split control stack register means, each of said split control stack register means for storing associated ones of said memory bank selection signals;

split stack write pointer means coupled to said request receiving means for alternating sequential storage of said memory bank selection signals in said split control stack registers in said first set and said second sets;

first read address pointer means coupled to said first set of split control stack registers for enabling read out of the selected one of said first set of split control stack registers;

second read address pointer means coupled to said second set of split control stack registers for enabling read out of the selected one of said second set of split control stack registers;

bank acknowledge receiving means for receiving bank acknowledge signals;

read address pointer control means responsively coupled to said bank acknowledge receiving means for alternately advancing said first read address pointer means and said second read address pointer means for interleaving selection of memory bank selection signals from said first and said second set of split control stack registers.

6. A split control stack as in claim 5 wherein said split stack write pointer means comprises:

write enable shift register means coupled to said request receiving means and having output terminals for enabling associated ones of said split control stack register means alternating said enabling between said first set and said second set in response to successive ones of said request in signals.

7. A split control stack as in claim 6 wherein said first read address pointer means and said second address pointer means each comprise:

read enable shift register means coupled for enabling read out of associated ones of said split control stack register means and coupled to said read address pointer control means for advancing said read enable shift register means in response to alternate ones of said memory bank acknowledge signals.

8. For use in a high performance storage unit capable of pipelined interaction with multiple requesting units, and having a plurality of addressable memory banks, memory bank access control circuitry for decoding, prioritizing, and issuing bank acknowledge signals in response to applied bank selection signals, a source of clock signal distributed in the unit, and capable of pipelining up to R requests for access to the memory banks without having received an acknowledge signal indicating that an access has been completed, a high performance virtual first-in first-out pipelined stack structure comprising:

request receiving means for receiving request in signals from an associated requester;

bank acknowledge receiving means for receiving bank acknowledge signals;

interface means for receiving data words to be written in memory banks at addressable locations;

clock signal receiving means for receiving predetermined ones of the clock signals for timing operation of the structure;

data stack means coupled to said interface means and said clock signal receiving means for receiving data words and at least temporarily storing said data words when enabled by predetermined ones of the clock signals, pending availability of access to the selected memory banks, said data stack means including R + 1 data stack register means for protecting at least R ones of said data stack register means against over-write at all times;

data stack write pointer means coupled to said data stack means for providing write address signals indicative of said R+1 data stack register means in a predetermined order and for enabling storage of the data words therein, and having write pointer advance means coupled to said request receiving means for advancing said data stack write pointer means for advancing said data stack write pointer means to address the next sequential one of said R+1 data stack register means in response to each request in signal received;

data stack read pointer means coupled to said data stack means for providing read address signals indicative of said R+1 data stack register means in a predetermined order, and having read pointer advance means coupled to said bank acknowledge receiving means for advancing said data stack read pointer means to address the next sequential one of said R+1 data stack register means in response to each bank acknowledge signal received;

data stack read decoder means responsively coupled to said data stack read pointer means for decoding said read address signals and enabling the read out of the selected ones of said R+1 data stack register means in response thereto;

a first set and a second set of split control stack register means, each of said split control stack register means for storing associated ones of said memory bank selection signals;

split stack write pointer means coupled to said request receiving means for alternating sequential storage of said memory bank selection signals in said split control stack registers in said first set and said second sets;

first read address pointer means coupled to said first set of split control stack registers for enabling read out of the selected one of said first set of split control stack registers;

second read address pointer means coupled to said second set of split control stack registers for enabling read out of the selected one of said second set of split control stack registers; and split control stack read address pointer control means responsively coupled to said bank acknowledge receiving means for alternately advancing said first read address pointer means and said second read address pointer means for interleaving selection of memory bank selection signals from said first and said second set of split control stack registers.

9. A stack structure as in claim 8 wherein said split stack write pointer means comprises:

write enable shift register means coupled to said request receiving means and having output terminals for enabling associated ones of said split control stack register means alternating said enabling between said first set and said second set in response to successive ones of said request in signals.

10. A stack structure as in claim 8 wherein said first read address pointer means and said second address pointer means each comprise:

read enable shift register means coupled for enabling read out of associated ones of said split control stack register means and coupled to said read address pointer control means for advancing said read enable shift register means is response to alternate ones of said memory bank acknowledge signals.

11. A data stack structure as in claim 8 wherein said data stack write pointer means includes:

shift register means having R+1 stages interconnected for advancing said write address signals in a predetermined order in response to said request in signals.

12. A data stack structure as in claim 8 wherein said data stack read pointer means includes:

read counter means for circularly counting in response to said bank acknowledge signals and first ones of said clock signals, and for providing R+1 ones of said read address signals, each for addressing an associated one of said R+1 stack register means.

13. A data stack structure as in claim 8 wherein said data stack read decoder means includes:

decode circuits means responsively coupled to said read counter means for providing R+1 unique read enable signals in response to said address signals.

* * * * *